(12) United States Patent
Wang

(10) Patent No.: US 12,719,255 B2
(45) Date of Patent: Aug. 25, 2026

(54) CABLE ASSEMBLY AND MANUFACTURING METHOD THEREFOR

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 308 days.

(21) Appl. No.: 18/549,561

(22) PCT Filed: Jan. 25, 2022

(86) PCT No.: PCT/CN2022/073606

§ 371 (c)(1),
(2) Date: Sep. 7, 2023

(87) PCT Pub. No.: WO2022/188566

PCT Pub. Date: Sep. 15, 2022

(65) Prior Publication Data

US 2024/0154401 A1 May 9, 2024

(30) Foreign Application Priority Data

Mar. 12, 2021 (CN) ......................... 202110269927.5

(51) Int. Cl.
*H02G 15/18* (2006.01)
*H01B 7/02* (2006.01)
(Continued)

(52) U.S. Cl.
CPC ........... *H02G 15/18* (2013.01); *H01B 7/0216* (2013.01); *H02G 1/14* (2013.01); *H02G 15/085* (2013.01)

(58) Field of Classification Search
CPC ........ H01B 7/0216; H01B 7/17; H01R 4/183; H01R 4/20; H01R 9/0518; H02G 1/14; H02G 15/085; H02G 15/18; Y02T 10/70
See application file for complete search history.

(56) References Cited

U.S. PATENT DOCUMENTS 3,859,455 A * 1/1975 Gommans ............ H01R 9/0503 174/92
3,872,237 A * 3/1975 Eyre .................... H02G 15/085 174/92
(Continued)

FOREIGN PATENT DOCUMENTS

CN 01378723 Y 1/2010
CN 103227448 A 7/2013
(Continued)

OTHER PUBLICATIONS

International Search Report for corresponding International Patent Application No. PCT/CN2022/073606 on Apr. 13, 2022.
(Continued)

*Primary Examiner* — Timothy J Thompson
*Assistant Examiner* — Rhadames Alonzo Miller
(74) *Attorney, Agent, or Firm* — LOZA & LOZA, LLP; Michael Fedrick

(57) ABSTRACT

The present disclosure provides a cable assembly and a manufacturing method therefore. The cable assembly provided by the present disclosure includes a first cable, a second cable and a shielding connection assembly. The first cable includes a first cable core and a first shielding layer. A first protective layer is wrapped around an outer side of the first cable core, and the first shielding layer is disposed on an outer side of the first protective layer. The second cable includes a second cable core and a second shielding layer. A second protective layer is wrapped around an outer side of the second cable core, and the second shielding layer is
(Continued)

disposed on an outer side of the second protective layer. The shielding connection assembly includes at least one shielding device, and at least one shielding device is connected to the first shielding layer and the second shielding layer.

17 Claims, 9 Drawing Sheets

(51) Int. Cl.
*H02G 1/14* (2006.01)
*H02G 15/08* (2006.01)

(56) References Cited

U.S. PATENT DOCUMENTS

| | | | | |
|---|---|---|---|---|
| 11,316,287 | B2 * | 4/2022 | Tohyama | H01R 4/20 |
| 2002/0040803 | A1 * | 4/2002 | Buyst | H02G 15/105 174/88 R |
| 2009/0218135 | A1 * | 9/2009 | Vallauri | H02G 15/184 174/88 C |
| 2011/0034066 | A1 * | 2/2011 | Jazowski | E21B 33/0385 439/426 |
| 2012/0040557 | A1 * | 2/2012 | Marsh | H01R 9/0518 439/585 |
| 2012/0285723 | A1 * | 11/2012 | Gundel | H01B 7/0823 174/113 R |
| 2014/0370741 | A1 * | 12/2014 | Bolcato | G01R 15/16 439/471 |
| 2018/0233893 | A1 * | 8/2018 | Adachi | H01B 7/18 |
| 2020/0132729 | A1 * | 4/2020 | Testa | H01B 7/18 |
| 2022/0224088 | A1 * | 7/2022 | Steinhaus | H02G 15/103 |
| 2022/0375653 | A1 * | 11/2022 | Guarino | H01B 9/028 |
| 2024/0154393 | A1 * | 5/2024 | Wang | H02G 1/14 |
| 2024/0154401 | A1 * | 5/2024 | Wang | H02G 15/085 |
| 2024/0170940 | A1 * | 5/2024 | Wang | H02G 15/08 |

FOREIGN PATENT DOCUMENTS

| | | | |
|---|---|---|---|
| CN | 108429022 | A | 8/2018 |
| CN | 108711819 | A | 10/2018 |
| CN | 112968416 | A | 6/2021 |
| CN | 112968417 | A | 6/2021 |
| JP | H04210 | A | 1/1992 |
| JP | H05122824 | A | 5/1993 |
| JP | 2001231123 | A | 8/2001 |
| JP | 2018133837 | A | 8/2018 |

OTHER PUBLICATIONS

Search Report issued for corresponding Chinese Patent Application No. 202110269927.5 on Apr. 14, 2023.

European Search Report for corresponding European Patent Application No. 22766093.3 dated Jul. 23, 2024, 12 pages.

Corresponding Japanese Patent Application No. 2023-554820, Office Action dated Nov. 26, 2024.

Office Action issued on Mar. 28, 2025 for counterpart European Patent Application No. 22766093.3, 7 pages.

* cited by examiner

CABLE ASSEMBLY AND MANUFACTURING METHOD THEREFOR

CROSS-REFERENCE TO RELATED APPLICATIONS

The present application is the U.S. national stage of International Patent Application No. PCT/CN2022/073606, filed on Jan. 25, 2022, which claims priority to Chinese Patent Application No. 202110269927.5, filed on Mar. 12, 2021, and entitled 'cable assembly and manufacturing method therefor', which is hereby incorporated by reference in its entirety.

TECHNICAL FIELD

The present disclosure relates to the technical field of cables, and particularly to a cable assembly and a manufacturing method therefor.

BACKGROUND

With the continuous development and widespread application of the new energy technologies, more and more vehicles are using batteries as power sources. In a vehicle equipped with a battery, electric devices such as a motor and an on-board computer need to be connected to the battery through a cable, so that the electric energy in the battery can be transmitted to the electric devices through the cable to enable, the electric devices to play their respective functions. In practical applications, the cable used to connect the battery and the electrical devices is not a complete cable, but composed of a plurality of cables which are connected in sequence.

Specifically, the cable generally includes a cable core and a shielding net wrapped around an outer side of the cable core. The main function of the cable core is to transmit power. The main function of the shielding net is to provide a good shielding effect on the cable core, so as to prevent a current magnetic field of the cable core from generating electromagnetic interference on external electrical components.

At present, the shielding connection structure used to butt two cables is immature, resulting in failure to form a stable and effective connection between the shielding nets of the two cables at the butting position, which is not conducive to ensuring the electromagnetic shielding effect between the cable cores.

SUMMARY

The present disclosure provides a cable assembly and a manufacturing method therefore, which are capable of effectively improving the electromagnetic shielding effect between cables.

It is one aspect of the present disclosure to provide a cable assembly, which includes a first cable, a second cable and a shielding connection assembly. The first cable includes a first cable core and a first shielding layer. a first protective layer is wrapped around an outer side of the first cable core, and the first shielding layer is disposed on an outer side of the first protective layer. The second cable includes a second cable core and a second shielding layer. A second protective layer wrapped around an outer side of the second cable core, and the second shielding layer is disposed on an outer side of the second protective layer. The shielding connection assembly is used to connect the first shielding layer and the second shielding layer. The shielding connection assembly includes at least one shielding device, and at least one shielding device is connected to the first shielding layer and the second shielding layer. That is, the first shielding layer and the second shielding layer may be connected through at least one shielding device, thereby ensuring the continuity of the shielding structure between the first cable and the second cable.

As an example, the shielding connection assembly may include four shielding devices, i.e., a first shielding internal device, a second shielding internal device, a first shielding middle device and a second shielding middle device. A first end of the conductive device is disposed on an outer side of an everted portion of a free end of the first shielding layer, and a second end of the conductive device is disposed on an outer side of an everted portion of a free end of the second shielding layer. The first shielding middle device is disposed on an outer side of the first end of the conductive device. The first end of the conductive device and the everted portion of the first shielding layer are pressed between the first shielding internal device and the first shielding middle device. The second shielding middle device is disposed on an outer side of the second end of the conductive device. The second end of the conductive device and the everted portion of the second shielding layer are pressed between the second shielding internal device and the second shielding middle device.

In the cable assembly provided by the present disclosure, through the conductive device, an effective electrical connection between the first shielding layer and the second shielding layer can be achieved, thereby ensuring the electromagnetic shielding performance between the first shielding layer and the second shielding layer. In addition, through the first shielding internal device and the first shielding middle device, the stable connection between the first shielding layer and the conductive device can be effectively ensured. Correspondingly, through the second shielding internal device and the second shielding middle device, the stable connection between the second shielding layer and the conductive device can be effectively ensured. In addition, since the first shielding layer has an everted portion, the stress strength between the first shielding layer and the conductive device can be effectively improved. Since the second shielding layer also has an everted portion, the stress strength between the second shielding layer and the conductive device can be effectively improved.

As an example, the shielding connection assembly further includes a first shielding external device and a second shielding external device. After the first shielding middle device is disposed on an outer side of the first end of the conductive device, the first end of the conductive device is everted and attached to an outer wall of the first shielding middle device, and the first shielding external device is disposed on an outer side of an everted portion of the first end of the conductive device. After the second shielding middle device is disposed on an outer side of the second end of the conductive device, the second end of the conductive device is everted and attached to an outer wall of the second shielding middle device, and the second shielding external device is disposed on an outer side of an everted portion of the second end of the conductive device.

Since the first end of the conductive device has an everted portion, the stress strength between the first shielding layer and the conductive device can be effectively improved. In addition, since the second end of the conductive device also has an everted portion, the stress strength between the second shielding layer and the conductive device can be effectively improved.

As an example, an inner wall of the conductive device is provided with an inner insulation layer, and the first end and the second end of the conductive device are not provided with the inner insulation layer. The inner insulation layer can well protect the inner side of the conductive device, thereby preventing the conductive device from being in conductive contact with other components inside the conductive device.

As an example, an outer wall of the conductive device is provided with an outer insulation layer, and the first end and the second end of the conductive device are not provided with the outer insulation layer. The outer insulation layer can well protect the outer side of the conductive device, thereby preventing the conductive device from being in conductive contact with other components outside the conductive device.

As an example, the first cable core and the second cable core may be lapped or butted, in which 'lap' means that the first cable core and the second cable core have overlapped areas, and 'butt' means that an end surface of the first cable core is connected to an end surface of the second cable core. During implementations, the connection mode for the first cable core and the second cable core may be reasonably selected and adjusted according to the actual situation, so as to ensure the connection effect between the first cable core and the second cable core.

In order to improve the connection effect between the first cable core and the second cable core, a minimum cross-sectional area of a lapped or butted position between the first cable core and the second cable core is greater than or equal to a smallest one of a cross-sectional area of the first cable core and a cross-sectional area of the second cable core.

An impedance of a connection position between the shielding device and the shielding layer and an impedance of a connection position between the conductive device and the shielding layer should be as small as possible, so that current generated by the shielding layer can flow back to an energy source or a grounded position without hindrance. If the impedance of the connection position between the shielding device and the shielding layer and the impedance of the connection position between the conductive device and the shielding layer are large, large current will be generated at the above connection positions, thereby causing a large radiation at the cable connection positions.

As an example, the cable assembly further includes an isolation sleeve disposed on an outer side of the first end of the first cable core and the first end of the second cable core. The isolation sleeve can well protect the exposed first cable core and the exposed second cable core, thereby improving the security thereof.

As an example, one end of the isolation sleeve is connected to the first protective layer, and the other end of the isolation sleeve is connected to the second protective layer. In this way, the first cable core and the second cable core may be hermetically protected, so that the safety thereof can be further improved.

As an example, the first cable further includes a third protective layer, and the second cable further includes a fourth protective layer. The third protective layer is disposed on an outer side of the first shielding layer, and the fourth protective layer is disposed on an outer side of the second shielding layer. The use safety and the structural strength of the first cable can be effectively improved by the third protective layer. Accordingly, the use safety and the structural strength of the second cable can be effectively improved by the fourth protective layer.

It is another aspect of the present disclosure to provide a manufacturing method for a cable assembly, including:

providing a first cable, which includes a first cable core, a first protective layer and a first shielding layer, the first protective layer is disposed on an outer side of the first cable core, and the first shielding layer is disposed on an outer side of the first protective layer;

peeling off the first shielding layer and the first protective layer at a first end of the first cable to expose the first cable core;

providing a second cable, which includes a second cable core, a second protective layer and a second shielding layer, the second protective layer is disposed on an outer side of the second cable core, and the second shielding layer is disposed on an outer side of the second protective layer;

peeling off the second shielding layer and the second protective layer at a first end of the second cable to expose the second cable core;

connecting a first end of the first cable core and a first end of the second cable core;

providing a shielding connection assembly, which includes an conductive device, a first shielding internal device, a first shielding middle device, a second shielding internal device and a second shielding middle device;

disposing the first shielding internal device on an outer side of a free end of the first shielding layer, and everting the free end of the first shielding layer so that an everted portion of the first shielding layer is attached to an outer wall of the first shielding internal device;

disposing the second shielding internal device of the first shielding layer a free end of the second shielding layer, and everting the free end of the second shielding layer so that an everted portion of the second shielding layer is attached to an outer wall of the second shielding internal device;

disposing a first end of the conductive device of the second shielding layer the everted portion of the first shielding layer, and disposing a second end of the conductive device of the second shielding layer the everted portion of the second shielding layer;

disposing the first shielding middle device of the second shielding layer the first end of the conductive device, and disposing the second shielding middle device of the second shielding layer the second end of the conductive device; and welding the first end of the conductive device and the everted portion of the first shielding layer between the first shielding internal device and the first shielding middle device, and welding the second end of the conductive device and the everted portion of the second shielding layer between the second shielding internal device and the second shielding middle device; or, crimping the first end of the conductive device and the everted portion of the first shielding layer between the first shielding internal device and the first shielding middle device, and crimping the second end of the conductive device and the everted portion of the second shielding layer between the second shielding internal device and the second shielding middle device; or, abutting the first end of the conductive device and the everted portion of the first shielding layer between the first shielding internal device and the first shielding middle device, and abutting the second end of the conductive device and the everted portion of the second shielding layer between the second shielding internal device and the second shielding middle device.

As an example, the shielding connection assembly further includes a first shielding external device and a second shielding external device, and the manufacturing method further includes:

everting the first end of the conductive device and attaching it to an outer wall of the first shielding middle device;

disposing the first shielding external device on an outer side of the everted portion of the first end of the conductive device;

everting the second end of the conductive device and attaching it to an outer wall of the second shielding middle device;

disposing the second shielding external device on an outer side of an everted portion of the second end of the conductive device; and welding the everted portion of the first end of the conductive device between the first shielding middle device and the first shielding external device, and welding the everted portion of the second end of the conductive device between the second shielding middle device and the second shielding external device; or crimping the everted portion of the first end of the conductive device between the first shielding middle device and the first shielding external device, and crimping the everted portion of the second end of the conductive device between the second shielding middle device and the second shielding external device; or abutting the everted portion of the first end of the conductive device between the first shielding middle device and the first shielding external device, and abutting the everted portion of the second end of the conductive device between the second shielding middle device and the second shielding external device.

As an example, the step of connecting the first end of the first cable core and the first end of the second cable core specifically includes:

connecting the first end of the first cable core and the first end of the second cable core by welding or crimping.

As an example, before the step of disposing one end of the conductive device on the outer side of the first shielding layer and disposing the other end of the conductive device on the outer side of the second shielding layer, the method further includes:

disposing an isolation sleeve on an outer side of a connection position between the first cable core and the second cable core.

The present disclosure achieves the following advantageous effects:

In the cable assembly provided by the present disclosure, through the conductive device, an effective electrical connection between the first shielding layer and the second shielding layer can be achieved, thereby ensuring the electromagnetic shielding performance between the first shielding layer and the second shielding layer. In addition, through the first shielding internal device and the first shielding middle device, the stable connection stability between the first shielding layer and the conductive device can be effectively ensured. Correspondingly, through the second shielding internal device and the second shielding middle device, effectively ensure the stable connection between the second shielding layer and the conductive device can be effectively ensured. In addition, since the first shielding layer has an everted portion and the second shielding layer also has an everted portion, the stress strength between the first shielding layer and the conductive device, and the stress strength between the second shielding layer and the conductive device can be effectively improved.

REFERENCE NUMERALS

10—first cable; 11—first cable core; 12—first protective layer; 13—first shielding layer; 131—everted portion; 14—third protective layer; 20—second cable; 21—second cable core; 22—second protective layer; 23—second shielding layer; 231—everted portion; 24—fourth protective layer; 30—shielding connection assembly; 31—conductive device; 311, 312—everted portion; 313—inner insulation layer; 314—outer insulation layer; 32—first shielding internal device; 33—first shielding middle device; 34—second shielding internal device; 35—second shielding middle device; 36—first shielding external device; 37—second shielding external device; 38—crimping ring; 39—isolation sleeve.

DETAILED DESCRIPTION

For a better understanding of the technical features of the present disclosure by those skilled in the art, a detailed description of the embodiments of the present disclosure will be set forth with reference to the drawings.

Figure 1:
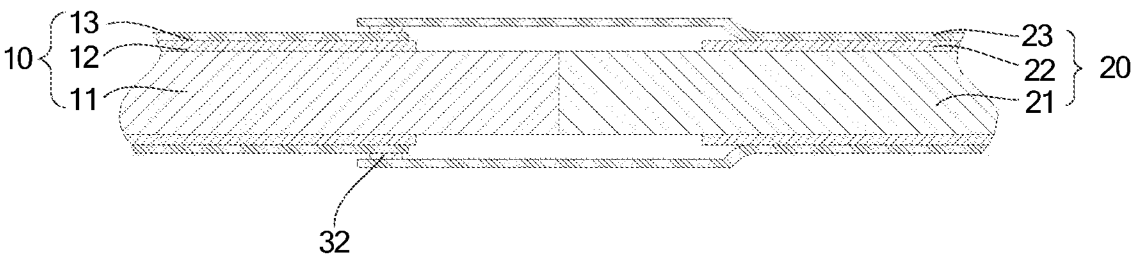
FIG. 1 illustrates a schematic diagram of a cross-sectional structure of a cable assembly according to an embodiment of the present disclosure.

As illustrated in FIG. 1, an embodiment of the present disclosure provides a cable assembly, which includes a first cable 10, a second cable 20 and a shielding connection assembly (not shown in the figures). The electromagnetic shielding structures in the first cable 10 and the second cable 20 are electrically connected through the shielding connection assembly, thereby realizing the continuity of the electromagnetic shielding structures between the first cable 10 and the second cable 20, and effectively improving the electromagnetic shielding effect of the cable assembly.

Specifically, in the embodiments of the present disclosure, the first cable 10 includes a first cable core 11 and a first shielding layer 13. The first protective layer 12 is wrapped around an outer side of the first cable core 11, and the first shielding layer 13 is disposed on an outer side of the first protective layer 12.

The main function of the first cable core 11 is to transmit electric energy. In specific configurations, the first cable core 11 may be made of a material with good electrical conductivity such as copper or aluminum.

The first protective layer 12 is wrapped around an outer side of the first cable core 11, thereby providing a good protection for the first cable core 11. In specific configurations, the first protective layer 12 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene, thereby providing a good electrical insulation for the first cable core 11.

The first shielding layer 13 is disposed on an outer side of the first protective layer 12 to provide electromagnetic shielding for the first cable core 11. An electromagnetic signal will be generated when current is applied to the first cable core 11, and the first shielding layer 13 may shield the electromagnetic signal to prevent it from being transmitted to the external environment. In specific configurations, the first shielding layer 13 may be made by winding conductive foils, or by weaving graphene and metal wires, thereby achieving a good flexibility. Alternatively, in some embodiments, an insulation protective layer may be formed on the surface of the first shielding layer 13 to improve the structural strength and safety of the first shielding layer 13.

The second cable 20 includes a second cable core 21 and a second shielding layer 23. A second protective layer 22 is wrapped around an outer side of the second cable core 21, and the second shielding layer 23 is disposed on an outer side of the second protective layer 22.

The main function of the second cable core 21 is to transmit electric energy. In specific configurations, the second cable core 21 may be made of a material with good electrical conductivity such as copper or aluminum.

The second protective layer 22 is wrapped around an outer side of the second cable core 21, thereby providing a good protection for the second cable core 21. In specific configurations, the second protective layer 22 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene, thereby providing a good electrical insulation for the second cable core 21.

The second shielding layer 23 is disposed on an outer side of the second protective layer 22 to provide electromagnetic shielding for the second cable core 21. An electromagnetic signal will be generated when current is applied to the second cable core 21, and the second shielding layer 23 may shield the electromagnetic signal to prevent it from being transmitted to the external environment. In specific configurations, the second shielding layer 23 may be made by winding conductive foils, or by weaving graphene and metal wires, thereby achieving a good flexibility. Alternatively, in some embodiments, an insulation protective layer may be formed on the surface of the second shielding layer 23 to improve the structural strength and safety of the second shielding layer 23.

Figure 15:
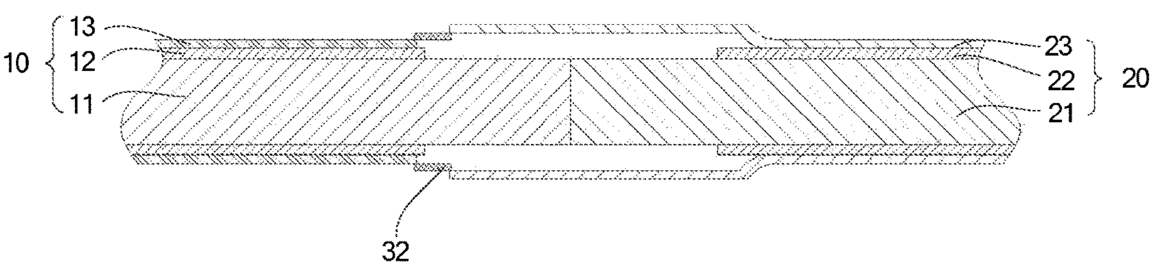
FIG. 15 illustrates a schematic diagram of a cross-sectional structure of another cable assembly according to an embodiment of the present disclosure.

Referring to FIGS. 1 and 15, in an embodiment of the present disclosure, the shielding connection assembly includes a first shielding internal device 32, which is disposed on an outer side of the first shielding layer 13 and connected to the second shielding layer 23, thereby ensuring the continuity of electromagnetic shielding between the first shielding layer 13 and the second shielding layer 23.

Generally, during implementations, the first shielding layer 13 and the second shielding layer 23 may be connected by one or more shielding devices.

Figure 17:
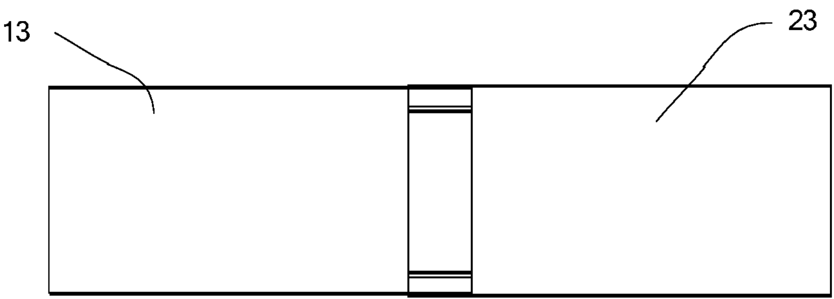
FIG. 17 illustrates a schematic diagram of a planar structure of shielding layers in symmetrical connection arrangement according to an embodiment of the present disclosure.
Figure 18:
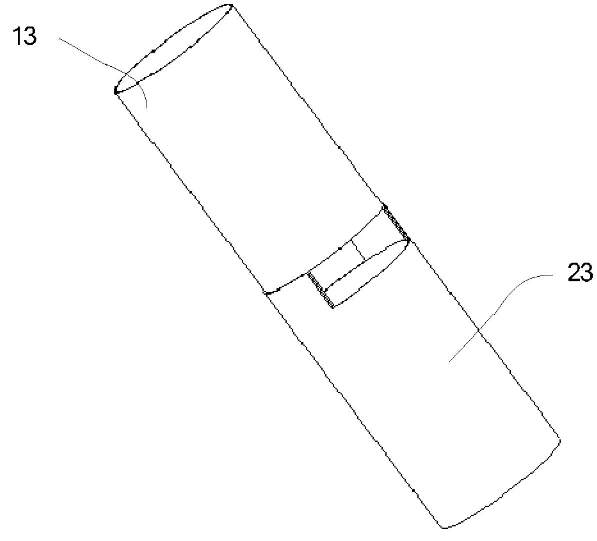
FIG. 18 illustrates a schematic diagram of a stereoscopic structure of shielding layers in symmetrical connection arrangement according to an embodiment of the present disclosure.

Referring to FIGS. 1, 17 and 18, specifically, connection positions between the shielding device (not shown) and the first shielding layer 13 are in a symmetrical connection arrangement, and connection positions between the shielding device and the second shielding layer 23 are in a symmetrical connection arrangement.

Figure 19:
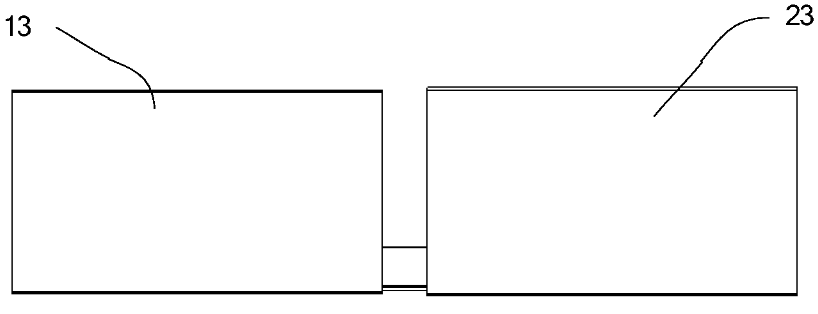
FIG. 19 illustrates a schematic diagram of a planar structure of shielding layers in asymmetrical connection arrangement according to an embodiment of the present disclosure.
Figure 20:
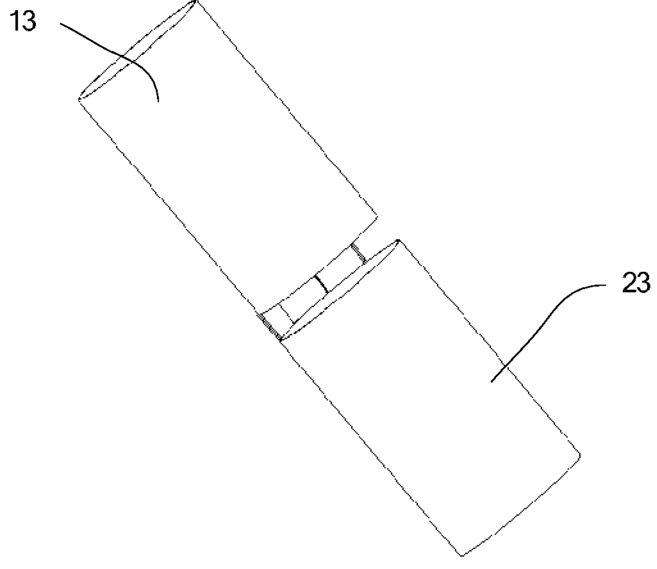
FIG. 20 illustrates a schematic diagram of a stereoscopic structure of shielding layers in asymmetrical connection arrangement according to an embodiment of the present disclosure.

Referring to FIGS. 19 and 20, if the connection position between the shielding device and the shielding layer is a single spot, a large current will flow through the connection position to generate a magnetic field, which will be coupled with a magnetic field generated by the cable core, thereby causing a large radiation at the entire cable connection position, and seriously affecting the working condition of other electrical appliances. When the connection positions between the shielding device and the shielding layer are symmetrical, the magnetic fields generated at the connection positions are in opposite directions and will offset each other to reduce the resultant magnetic field, thereby decreasing the radiation at the cable connection position, effectively reducing the magnetic field generated by the cable core and weaking the affection on other electrical appliances.

Specifically, the connection position between the shielding device and the first shielding layer 13 is in a 360° connection arrangement, i.e., the shielding device is completely butted with an end of the first shielding layer 13. The connection position between the shielding device and the second shielding layer 23 is in a 360° connection arrangement, i.e., the shielding device is completely butted with an end of the second shield layer 23.

Compared with the symmetrical connection arrangement of the connection positions between the shielding device and the shielding layer, the 360° connection arrangement of the connection position between the shielding device and the shielding layer can greatly shield and offset the radiation generated by the cable core and the radiation generated by the shielding layer itself, thereby achieving an optimal shielding effect at the cable connection position.

The test method is as follows: a test instrument outputs a signal value (recorded as test value 2) to a first cable or a second cable, and a detection device is disposed outside the cable assembly to detect a signal value (recorded as test value 1). A shielding performance value=test value 2−test value 1.

Table 1 shows the influence of the arrangement of the connection position between the shielding device and the shielding layer on the shielding performance.

TABLE 1

| Test parameter | Arrangement of the connection position between the shielding device and the shielding layer | | |
|---|---|---|---|
| | Asymmetrical arrangement | Symmetrical arrangement | 360° arrangement |
| Shielding performance value (dB) | 52 | 64 | 74 |

The above table shows the data obtained by performing a test on a selected cable with a certain wire diameter. The standard requirement is that the shielding performance value of the connection position between the shielding device and the shielding layer is greater than 60 dB.

In a case where the connection positions between the shielding device and the shielding layer have a same size and are arranged asymmetrically, the shielding performance value thereof is less than 60 dB, which does not meet the standard requirement. When the connection positions are arranged symmetrically, even though the shielding device and the shielding layer are not completely connected, the shielding performance value thereof still meets the standard requirement since the electromagnetic radiation is offset. Exemplarily, when the connection position between the shielding device and the shielding layer is in a 360° connection arrangement, the shielding performance of the cable connection point is better.

In addition, during implementations, the first shielding internal device 32 and the second shielding layer 23 may also be connected by other structures.

Figure 2:
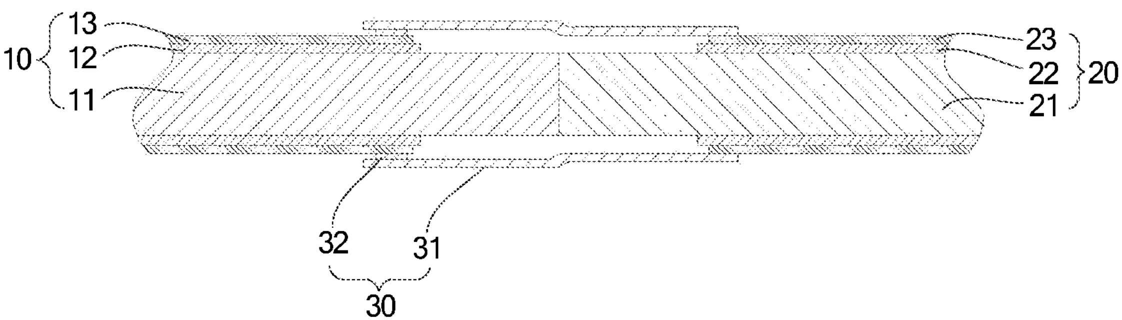
FIG. 2 illustrates a schematic diagram of a cross-sectional structure of another cable assembly according to an embodiment of the present disclosure.
Figure 16:
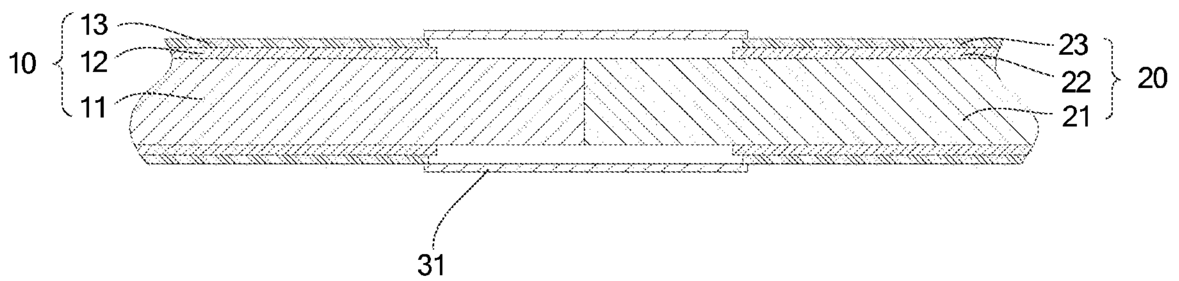
FIG. 16 illustrates a schematic diagram of a cross-sectional structure of another cable assembly according to an embodiment of the present disclosure.

For example, as illustrated in FIGS. 2 and 16, in another embodiment of the present disclosure, the shielding connection assembly 30 further includes an conductive device 31. The conductive device 31 is disposed on an outer side of the first shielding internal device 32 to realize the connection between the conductive device 31 and the first shielding internal device 32.

Specifically, connection positions between a first end of the conductive device 31 and the first shielding layer 13 are in a symmetrical connection arrangement, and connection positions between a second end of the conductive device 31 and the second shielding layer 23 are in a symmetrical connection arrangement.

If the connection position between the conductive device 31 and the shielding layer is a single spot, a large current will flow through the connection position to generate a magnetic field, which will be coupled with a magnetic field generated by the cable core, thereby causing a large radiation at the entire cable connection position, and seriously affecting the working condition of other electrical appliances. When the connection positions between the conductive device 31 and the shielding layer are symmetrical, the magnetic fields generated at the connection positions are in opposite directions and will offset each other to reduce the resultant magnetic field, thereby decreasing the radiation at the cable connection position, effectively reducing the magnetic field generated by the cable core and weaking the affection on other electrical appliances.

Specifically, the connection position between the first end of the conductive device 31 and the first shielding layer 13 is in a 360° connection arrangement, and the connection position between the second end of the conductive device 31 and the second shielding layer 23 is in a 360° connection arrangement.

Compared with the symmetrical connection arrangement of the connection positions between the conductive device 31 and the shielding layer, the 360° connection arrangement of the connection position between the conductive device 31 and the shielding layer can greatly shield and offset the radiation generated by the cable core and the radiation generated by the shielding layer itself, so as to achieve an optimal shielding effect at the cable connection position.

The test method is as follows: a test instrument outputs a signal value (recorded as test value 2) to a first cable 10 or a second cable 20, and a detection device is disposed outside the cable assembly to detect a signal value (recorded as test value 1). A shielding performance value=test value 2−test value 1.

Table 2 shows the influence of the arrangement of the connection position between the conductive device and the shielding layer on the shielding performance.

TABLE 2

| Test parameter | Arrangement of the connection position between the conductive device and the shielding layer | | |
|---|---|---|---|
| | Asymmetrical arrangement | Symmetrical arrangement | 360° arrangement |
| Shielding performance value (dB) | 51 | 65 | 77 |

The above table shows the data obtained by performing a test on a selected cable with a certain wire diameter. The standard requirement is that the shielding performance value of the connection position between the conductive device and the shielding layer is greater than 60 dB.

In a case where the connection positions between the conductive device 31 and the shielding layer have a same size and are arranged asymmetrically, the shielding performance value thereof is less than 60 dB, which does not meet the standard requirement. When the connection positions are arranged symmetrically, even though the conductive device

31 and the shielding layer are not entirely connected, the shielding performance value thereof still meets the standard requirement since the electromagnetic radiation is offset. Exemplarily, when the connection position between the conductive device 31 and the shielding layer is in a 3600 connection arrangement, the shielding performance of the cable connection point is better.

Figure 3:
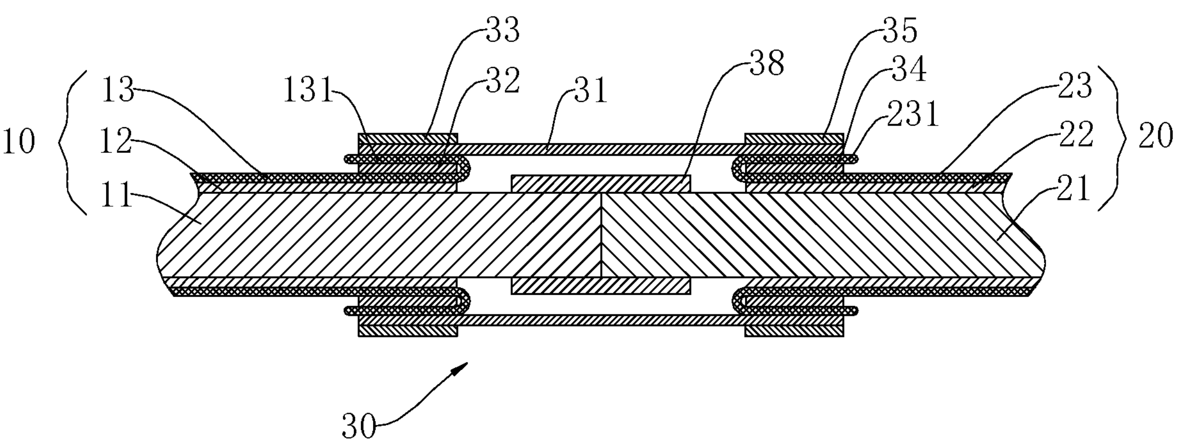
FIG. 3 illustrates a schematic diagram of a cross-sectional structure of another cable assembly according to an embodiment of the present disclosure.

Alternatively, more structural members may be included in the shielding connection assembly 30. For example, as illustrated in FIG. 3, in an embodiment of the present disclosure, the shielding connection assembly 30 includes a conductive device 31, a first shielding internal device 32, a first shielding middle device 33, a second shielding internal device 34 and a second shielding middle device 35. A first end (a left end in the figure) of the conductive device 31 is electrically connected to a free end of the first shielding layer 13, and a second end (a right end in the figure) of the conductive device 31 is electrically connected to a free end of the second shielding layer 23, so as to realize the electrical connection between the first shielding layer 13 and the second shielding layer 23, thereby ensuring the continuity of electromagnetic shielding between the first shielding layer 13 and the second shielding layer 23.

Specifically, the first shielding layer 13 and the conductive device 31 are fixedly and electrically connected through the first shielding internal device 32 and the first shielding middle device 33. The first shielding internal device 32 is disposed on an outer side of the first shielding layer 13, and the free end of the first shielding layer 13 is everted by 180° and then attached to an outer wall of the first shielding internal device 32. The first end (the left end in the figure) of the conductive device 31 is disposed on an outer side of an everted portion 131 of the free end of the first shielding layer 13, and an inner wall of the first end of the conductive device 31 is well attached to the everted portion 131, so as to realize the electrical connection between the first shielding layer 13 and the conductive device 31.

The first shielding middle device 33 is disposed on an outer side of the first end of the conductive device 31, and a certain force is exerted on the first shielding middle device 33 using a tool such as a crimping plier, so that the first shielding middle device 33 is deformed inward. Meanwhile, since the first shielding internal device 32 has a certain structural strength, a certain stress can be maintained between the first shielding middle device 33 and the first shielding internal device 32, so that the everted portion 131 of the first shielding layer 13 and the left end of the conductive device 31 are pressed between the first shielding middle device 33 and the first shielding internal device 32. In addition, the everted portion 131 can improve the connection strength between the first shielding layer 13 and the conductive device 31, which is beneficial to ensure the connection stability between the first shielding layer 13 and the conductive device 31. Alternatively, the everted portion 131 of the first shielding layer 13 and the left end of the conductive device 31 may be welded between the first shielding middle device 33 and the first shielding internal device 32 by laser welding, ultrasonic welding, resistance welding, pressure diffusion welding, or soldering, etc.

The second shielding layer 23 and the conductive device 31 are fixedly and electrically connected through the second shielding internal device 34 and the second shielding middle device 35. Specifically, the second shielding internal device 34 is disposed on an outer side of the second shielding layer 23, and a free end of the second shielding layer 23 is everted by 180° and then attached to an outer wall of the second shielding internal device 34. A second end (a right end in the figure) of the conductive device 31 is disposed on an outer side of an everted portion 231 of the free end of the second shielding layer 23, and an inner wall of a second end of the conductive device 31 is well attached to the everted portion 231, so as to realize the electrical connection between the second shielding layer 23 and the conductive device 31.

The first shielding middle device 35 is disposed on an outer side of the second end of the conductive device 31, and a certain force is exerted on the second shielding middle device 35 using a tool such as a crimping plier, so that the second shielding middle device 35 is deformed inward. Meanwhile, since the second shielding internal device 34 has a certain structural strength, a certain stress can be maintained between the second shielding middle device 35 and the second shielding internal device 34, so that the everted portion 231 of the second shielding layer 23 and the right end of the conductive device 31 are pressed between the second shielding middle device 35 and the second shielding internal device 34. In addition, the everted portion 231 can improve the connection strength between the second shielding layer 23 and the conductive device 31, which is beneficial to ensure the connection stability between the second shielding layer 23 and the conductive device 31. Alternatively, the everted portion 231 of the second shielding layer 23 and the right end of the conductive device 31 may be welded between the second shielding middle device 35 and the second shielding internal device 34 by laser welding, ultrasonic welding, resistance welding, pressure diffusion welding, or soldering, etc.

Figure 4:
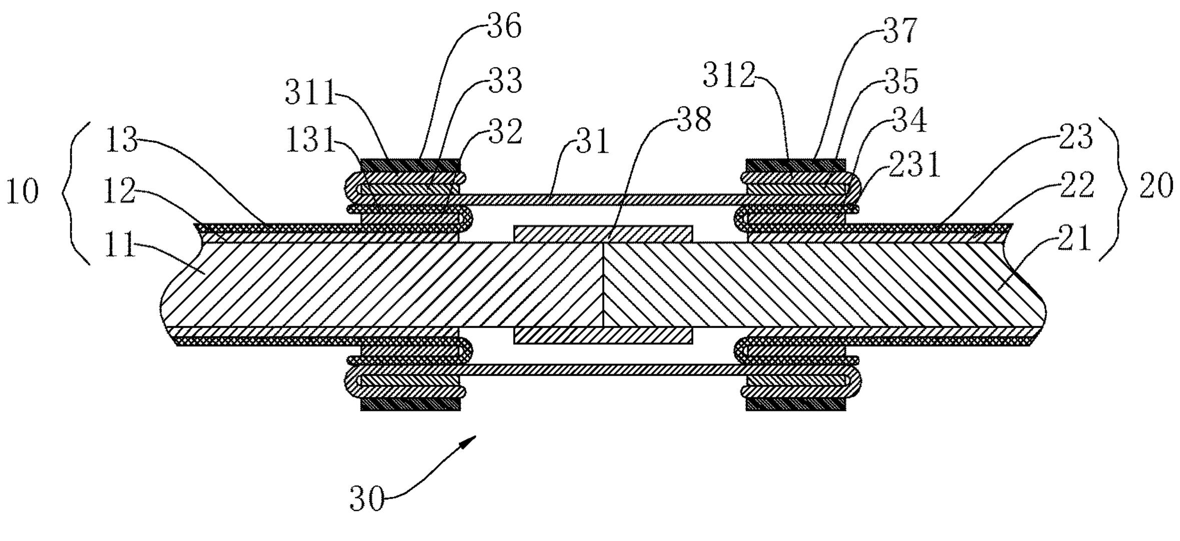
FIG. 4 illustrates a schematic diagram of a cross-sectional structure of another cable assembly according to an embodiment of the present disclosure.

In addition, as illustrated in FIG. 4, the present disclosure further provides another embodiment. Specifically, a first shielding external device 36 and a second shielding external device 37 are added in the shielding connection assembly 30.

After the first shielding middle device 33 is pressed using a tool such as a crimping plier, the first end (left end) of the conductive device 31 may be everted by 180°, so that the everted portion 311 is attached to the outer wall of the first shielding middle device 33. Then, the first shielding external device 36 is disposed on an outer side of the everted portion 311, and finally, the first shielding external device 36 is pressed using a tool such as a crimping plier, so that the everted portion 311 of the conductive device 31 is pressed between the first shielding external device 36 and the first shielding middle device 33, which prevents the conductive device 31 from being separated from the first shielding external device 36 and the first shielding middle device 33, thereby increasing the connection stability of the cable assembly. Alternatively, the everted portion 311 of the conductive device 31 may also be welded between the first shielding middle device 33 and the first shielding external device 36 by laser welding, ultrasonic welding, resistance welding, pressure diffusion welding, or soldering, etc.

Correspondingly, after the second shielding middle device 35 is pressed using a tool such as a crimping plier, the second end (right end) of the conductive device 31 may be everted by 180°, so that the everted portion 312 is attached to the outer wall of the second shielding middle device 35. Then, the second shielding external device 37 is disposed on an outer side of the everted portion 312, and finally, the second shielding external device 37 is pressed using a tool such as a crimping plier, so that the conductive device 31 is pressed between the second shielding external device 37 and the second shielding middle device 35, which prevents the conductive device 31 from being separated from the second shielding external device 37 and the second shielding middle device 35, thereby increasing the connection stability of the cable assembly. Alternatively, the everted portion 312 of the conductive device 31 may also be welded between the second shielding middle device 35 and the second shielding external device 37 by laser welding, ultrasonic welding, resistance welding, pressure diffusion welding, or soldering, etc.

During implementations, the structural forms of the components of the shielding connection assembly 30 may be various.

For example, the shielding connection assembly 30 may only include at least one shielding device. The shielding device may be disposed on the outer side of the first shielding layer 13 and connected to the second shielding layer 23, i.e., the first shielding layer 13 and the second shielding layer 23 may be mechanically and electrically connected to each other through one or more shielding devices. In addition, when the shielding connection assembly includes the conductive device 31, the first end of the conductive device 31 may be directly connected (e.g., welded) to the first shielding layer 13. Alternatively, the first end of the conductive device 31 may be connected to the first shielding layer 13 through at least one shielding device, so as to realize a mechanical and electrical connection between the conductive device 31 and the first shielding layer 13. The second end of the conductive device 31 may be directly connected (e.g., welded) to the second shielding layer 23. Alternatively, the second end of the conductive device 31 is connected to the second shielding layer 23 through at least one shielding device, so as to realize a mechanical and electrical connection between the conductive device 31 and the second shielding layer 23.

In addition, the conductive device 31 may be a straight barrel structure with a uniform barrel diameter in a length direction thereof, or a barrel structure with non-uniform barrel diameters (e.g., gradually or locally increased).

Figure 5:
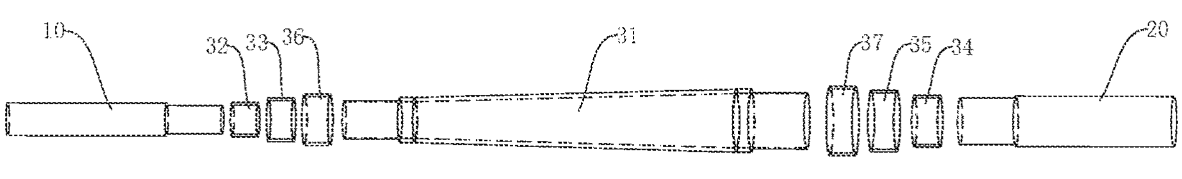
FIG. 5 illustrates a schematic diagram of an exploded structure of a cable assembly according to an embodiment of the present disclosure.
Figure 6:
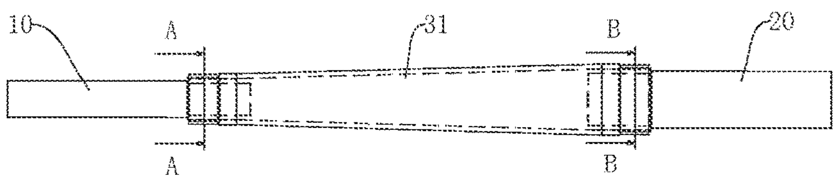
FIG. 6 illustrates a schematic diagram of a planar structure of a cable assembly according to an embodiment of the present disclosure.

For example, as illustrated in FIGS. 5 and 6, the barrel diameter of the conductive device 31 is gradually increased from left to right.

In addition, a cross-section of the conductive device 31 may be a annular structure of circular, elliptical, polygonal or irregular shape. The cross-sectional shapes of the first end and the second end of the conductive device 31 may be the same or different.

Figure 7:
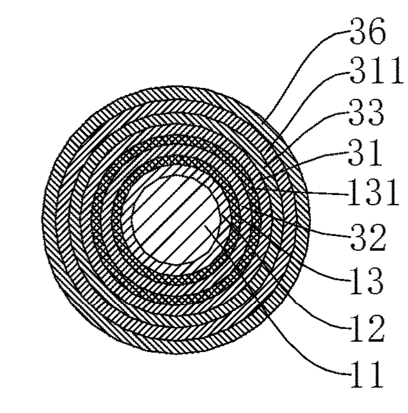
FIG. 7 illustrates a cross-sectional view taken along a line A-A in FIG. 6.
Figure 8:
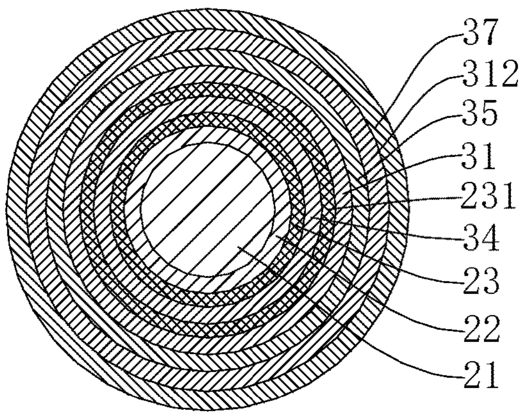
FIG. 8 illustrates a cross-sectional view taken along a line B-B in FIG. 6.
Figure 9:
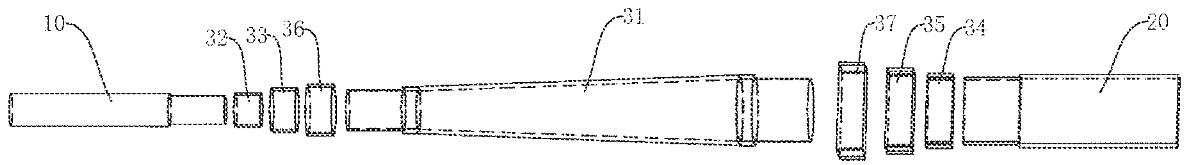
FIG. 9 illustrates a schematic diagram of an exploded structure of another cable assembly according to an embodiment of the present disclosure.
Figure 10:
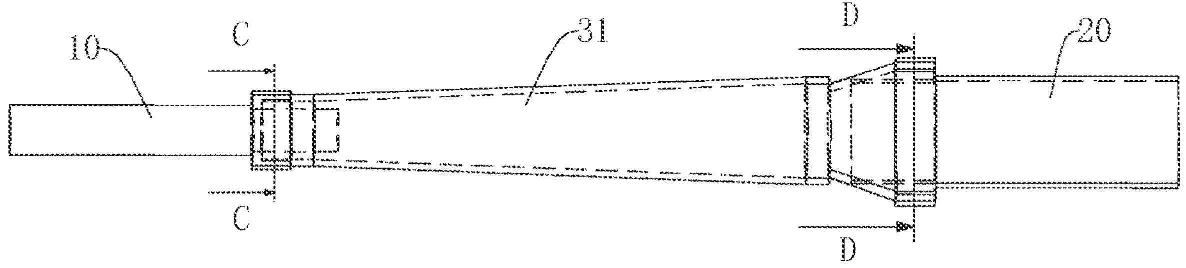
FIG. 10 illustrates a schematic diagram of a planar structure of another cable assembly according to an embodiment of the present disclosure.

For example, as illustrated in FIGS. 6 to 8, the cross-sectional shapes of the first end and the second end of the conductive device 31 are both circular rings, and the drum diameter of the first end of the conductive device 31 is smaller than that of the second end.

Alternatively, as illustrated in FIGS. 9 to 12, the cross-sectional shape of the first end of the conductive device 31 is of circular ring, and the cross-sectional shape of the second end is of rectangular ring.

During manufacturing, the conductive device 31 may be a barrel structure made of a conductive material such as copper, aluminum, graphene, etc. Alternatively, the conductive device 31 may be a barrel structure made by winding conductive foils, or by weaving graphene and metal wires, thereby achieving certain flexibility to improve the application range and the seismic performance. The material and the manufacturing mode of the conductive device 31 are not limited in the present disclosure.

The cross-section of the first shielding internal device 32 may be an annular structure of circular, elliptical, polygonal or irregular shape.

The cross-section of the first shielding middle device 33 may be an annular structure of circular, elliptical, polygonal or irregular shape.

The cross-section of the first shielding external device 36 may be an annular structure of circular, elliptical, polygonal or irregular shape, so as to effectively enlarge the application range of the shielding connection assembly.

The cross-sectional shapes of the first shielding internal device 32 and the first shielding external device 36 may be substantially the same to ensure the crimping effect between the first shielding internal device 32 and the first shielding external device 36.

In addition, during implementations, the everted portion 131 of the first shielding layer 13 and the first end of the conductive device 31 are pressed between the first shielding middle device 33 and the first shielding internal device 32, and the everted portion 311 of the first end of the conductive device 31 is pressed between the first shielding middle device 33 and the first shielding external device 36. Thus, in order to improve the crimping effect, the cross-sectional profiles of the first shielding layer 13, the first end of the conductive device 31, the first shielding internal device 32, the first shielding middle device 33 and the first shielding external device 36 may be substantially the same. In addition, during applications, the cross-sectional shapes of the first shielding layer 13 and the second shielding layer 23 may also be annular structures of circular, elliptical, polygonal or irregular shape.

Figure 11:
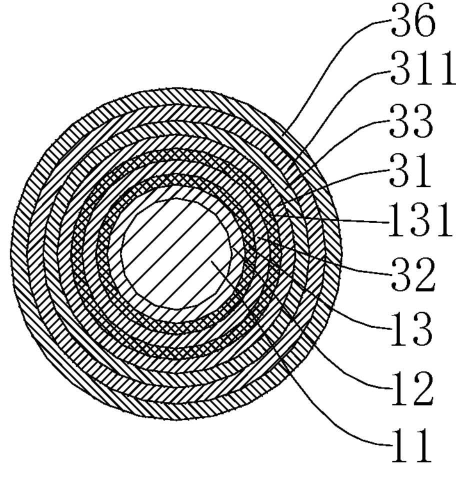
FIG. 11 illustrates a cross-sectional view taken along a line C-C in FIG. 10.

For example, as illustrated in FIG. 11, in an embodiment of the present disclosure, the cross-sectional profiles of the first shielding layer 13, the first end of the conductive device 31, the first shielding internal device 32, the first shielding middle device 33 and the first shielding external device 36 are all circular ring shape.

The cross-section of the second shielding internal device 34 may be an annular structure of circular, elliptical, polygonal or irregular shape.

The cross-section of the second shielding middle device 35 may be an annular structure of circular, elliptical, polygonal or irregular shape.

The cross-section of the second shielding external device 37 may be an annular structure of circular, elliptical, polygonal or irregular shape, so that the application range of the shielding connection assembly can be effectively expanded.

In addition, during implementations, the free end of the second shielding layer 23 and the second end of the conductive device 31 are pressed between the second shielding middle device 35 and the second shielding internal device 34, and the everted portion 312 of the second end of the conductive device 31 is pressed between the second shielding middle device 35 and the second shielding external device 37. Thus, in order to improve the crimping effect, the cross-sectional profiles of the second shielding layer 23, the second end of the conductive device 31, the second shielding internal device 34, the second shielding middle device 35 and the second shielding external device 37 may be substantially the same.

Figure 12:
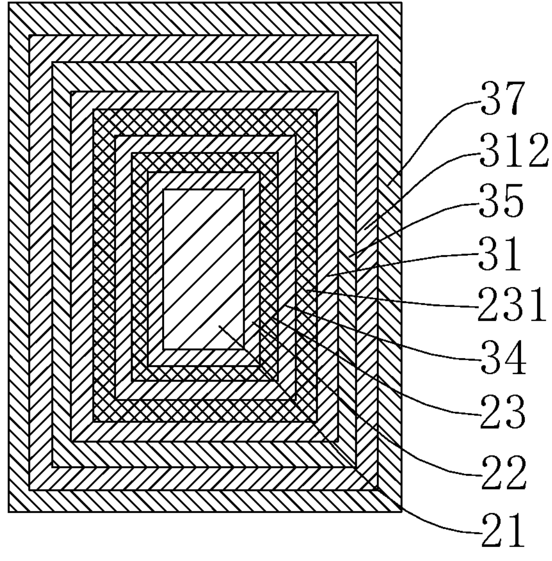
FIG. 12 illustrates a cross-sectional view taken along a line D-D in FIG. 10.

For example, as illustrated in FIG. 12, in an embodiment of the present disclosure, the cross-sectional profiles of the second shielding layer 23, the second end of the conductive device 31, the second shielding internal device 34, the second shielding middle device 35 and the second shielding external device 37 are all rectangular ring-shaped structures.

During manufacturing, the first shielding internal device 32 may be made of a material such as copper or aluminum and shaped by a process such as cutting, stamping, etc. Correspondingly, the first shielding middle device 33 and the first shielding external device 36 may also be made of a material such as copper or aluminum and shaped by a process such as cutting, stamping, etc.

In addition, in some embodiments, in order to improve a pressing force between the first shielding internal device 32 and the first shielding middle device 33, a structural strength of the first shielding internal device 32 may be greater than that of the first shielding middle device 33, so that when a pressing force is applied to the first shielding middle device 33, the first shielding internal device 32 will not be deformed obviously. Correspondingly, in order to improve a pressing force between the first shielding middle device 33 and the first shielding external device 36, a structural strength of the first shielding middle device 33 may be greater than that of the first shielding external device 36, so that when a pressing force is applied to the first shielding external device 36, the first shielding middle device 33 will not be deformed obviously.

The material and the manufacturing mode of the second shielding internal device 34 may be similar to those of the first shielding internal device 32. Accordingly, the material and the manufacturing mode of the second shielding middle device 35 may be similar to those of the first shielding external device 36, which will not be described here.

Figure 13:
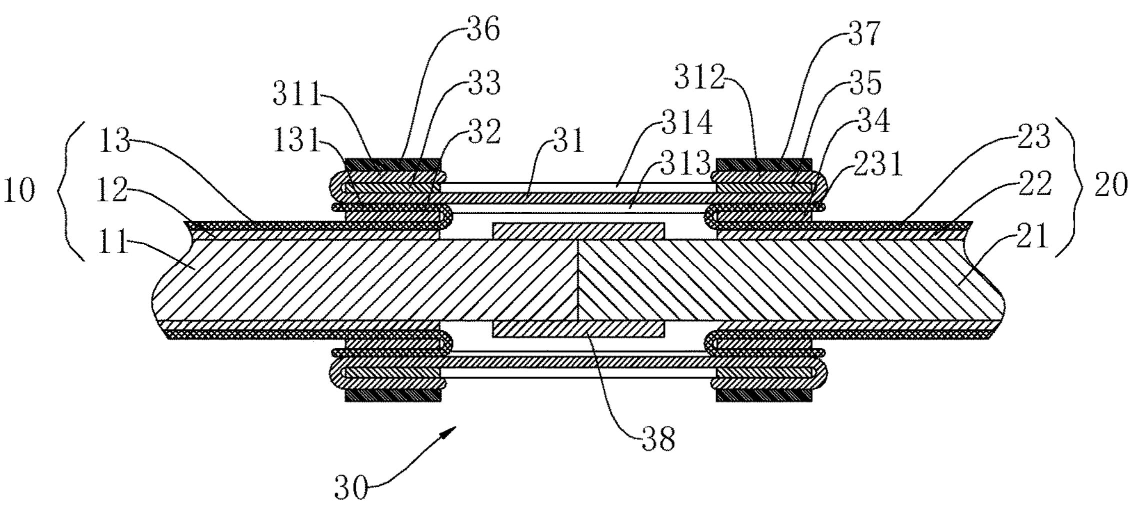
FIG. 13 illustrates a schematic diagram of a cross-sectional structure of another cable assembly according to an embodiment of the present disclosure.

As illustrated in FIG. 13, in some embodiments, an inner insulation layer 313 may be provided on an inner wall of the conductive device 31, so as to prevent the conductive device 31 from short-circuiting with other components inside the conductive device 31.

In addition, an outer insulation layer 314 may be provided on an outer wall of the conductive device 31, so as to prevent the conductive device 31 from short-circuiting with other components outside the conductive device 31.

The inner insulation layer 313 and the outer insulation layer 314 may be made of polyvinyl chloride, polyethylene, nylon, etc., or may be made of any other material with a good electrical insulation performance, which is not limited in the present disclosure.

In addition, in order to realize an electrical connection between the first cable 10 and the second cable 20 to achieve power transmission, one end of the first cable core 11 is connected to one end of the second cable core 21.

During implementations, the first cable core 11 and the second cable core 21 may be connected by crimping, laser welding, ultrasonic welding, resistance welding, pressure diffusion welding, or soldering, etc.

For example, as illustrated in FIG. 13, in an embodiment of the present disclosure, the first cable core 11 and the second cable core 21 are connected by crimping. Specifically, an end face of the first cable core 11 is butted with an end face of the second cable core 21, and a crimping ring 38 is disposed on an outer side of a butt connection position between the first cable core 11 and the second cable core 21. The crimping ring 38 is pressed by a tool such as a crimping plier, so that the crimping ring 38 is firmly disposed on the outer sides of the first cable core 11 and the second cable core 21, thereby realizing the conductive connection between the first cable core 11 and the second cable core 21.

In specific configurations, the crimping ring 38 may be made of a material with good electrical conductivity such as copper or aluminum, so as to improve the electrical connection performance between the first cable core 11 and the second cable core 21.

It can be understood that during implementations, the cross-sectional profiles of the first cable core 11 and the second cable core 21 may be the same or different. For example, the cross-sectional profiles of the first cable core 11 and the second cable core 21 may both be circular.

Alternatively, in other embodiments, the butt connection position between the first cable core 11 and the second cable core 21 may also be specially treated to increase the effective contact area therebetween, thereby improving the electrical connection performance between the first cable core 11 and the second cable core 21.

Figure 14:
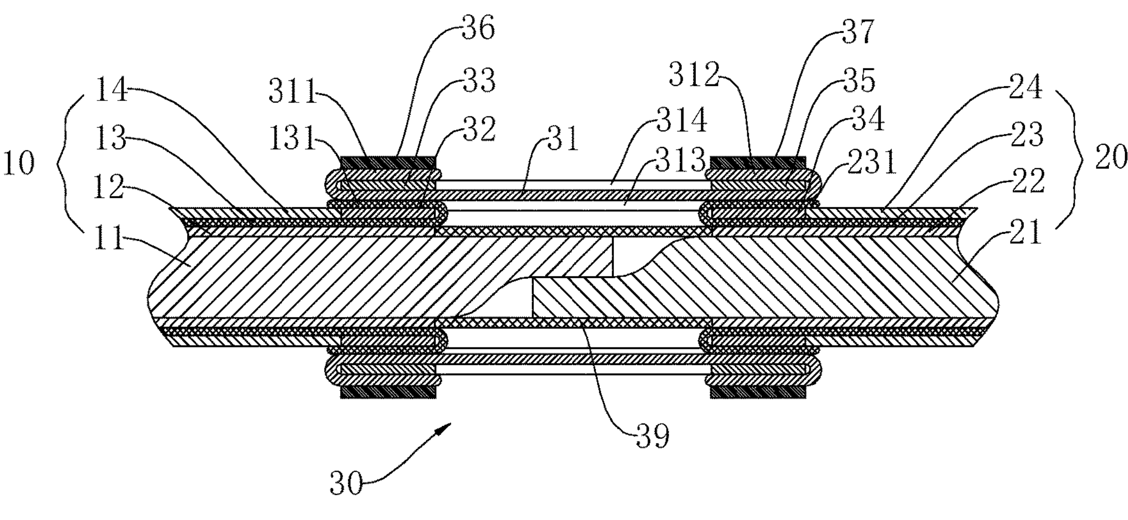
FIG. 14 illustrates a schematic diagram of a cross-sectional structure of another cable assembly according to an embodiment of the present disclosure.

For example, as illustrated in FIG. 14, in an embodiment of the present disclosure, the first cable core 11 and the second cable core 21 are connected by welding. Specifically, approximately half of a right end of the first cable core 11 is cut off from the cable core, thereby forming a large contact surface; and approximately half of a left end of the second cable core 21 is cut off from the cable core, thereby forming a large contact surface. Therefore, when the first cable core 11 and the second cable core 21 are welded, the first cable core 11 and the second cable core 21 can be partially overlapped, so as to increase the welding area between the first cable core 11 and the second cable core 21, thereby ensuring the connection effect between the first cable core 11 and the second cable core 21. An overlapping area of the first cable core 11 and the second cable core 21 may be greater than or equal to the cross-sectional area of the first cable core or the second cable core.

In addition, in order to provide a good protection for the connection position between the first cable core 11 and the second cable core 21, in an embodiment of the present disclosure, an isolation sleeve 39 is disposed on an outer side of the connection position between the first cable core 11 and the second cable core 21.

During specific configurations, the isolation sleeve 39 may be a heat shrinkable tube, or be made of an insulation material including one or more selected from the group consisting of polyvinyl chloride, polyurethane, nylon, polypropylene, silicone rubber, cross-linked polyolefin, synthetic rubber, polyurethane elastomer, cross-linked polyethylene and polyethylene, and injection molded on an outer side of the butt connection position. A left end of the isolation sleeve 39 may be butted with the first protective layer 12 of the first cable 10, and a right end of the isolation sleeve 39 may be butted with the second protective layer 22 of the second cable 20, so as to well protect the first cable core 11 and the second cable core 21.

The thickness of the first shielding layer 13, the thickness of the second shielding layer 23, and the thickness of the conductive device 31 may be 0.003 mm to 27 mm.

The test method is as follows: a test instrument outputs a signal value (recorded as test value 2) to a first cable or a second cable, and a detection device is disposed outside the cable assembly to detect a signal value (recorded as test value 1). A shielding performance value=test value 2−test value 1.

Table 3 shows an influence of thicknesses of the shielding layer and the conductive device on the shielding performance and the bending radius increment.

TABLE 3

| Test parameter | Thickness of the shielding layer (mm) | | | | | | | | | | |
|---|---|---|---|---|---|---|---|---|---|---|---|
| | 0.001 | 0.003 | 0.005 | 0.01 | 0.05 | 0.1 | 0.2 | 0.4 | 0.6 | 0.8 | 1 |
| Shielding performance value (dB) | 53 | 60.7 | 62.4 | 64.6 | 66.3 | 68.6 | 70.3 | 72.5 | 73.4 | 74.5 | 76.3 |
| Bending radius increment (mm) | 1 | 1.1 | 1.3 | 1.5 | 2 | 2.4 | 2.5 | 2.9 | 3.3 | 3.7 | 4 |

| Test parameter | Thickness of the shielding layer (mm) | | | | | | | | | | |
|---|---|---|---|---|---|---|---|---|---|---|---|
| | 3 | 5 | 10 | 15 | 20 | 25 | 26 | 27 | 28 | 29 | 30 |
| Shielding performance value (dB) | 78.6 | 80.3 | 82.1 | 85.6 | 87.4 | 90.7 | 93.8 | 95.3 | 95.7 | 95.3 | 95.5 |
| Bending radius increment (mm) | 5 | 6 | 9.5 | 15.5 | 77 | 178 | 183 | 189 | 211 | 231 | 253 |

The above table shows the data obtained by performing a test on a selected cable with a certain wire diameter. The standard requirement is that the shielding performance value of the connection positions between the conductive device and the shielding layer is greater than 60 dB.

According to the test results shown in the table, when the thicknesses of the first shielding layer 13, the second shielding layer 23 and the conductive device 31 are 0.003 mm to 27 mm, the shielding performance of the first cable 10 and the second cable 20 increases along with the increase of the thickness. But when the thicknesses of the first shielding layer 13, the second shielding layer 23 and the conductive device 31 are greater than 27 mm, the shielding performance of the first cable 10 and the second cable 20 changes little without a significant increase. When the thicknesses of the first shielding layer 13, the second shielding layer 23 and the conductive device 31 are 0.003 mm to 27 mm, the bending radius increments of the first cable 10 and the second cable 20 increase along with the increase of the thickness. But when the thicknesses of the first shielding layer 13, the second shielding layer 23 and the conductive device 31 are greater than 27 mm, the bending radius increments of the first cable 10 and the second cable 20 increase by more than 200 mm, which is not conducive to actual processing. Therefore, it is preferable that the thicknesses of the first shielding layer 13, the second shielding layer 23 and the conductive device 31 are 0.003 mm to 27 mm.

In addition, an outer surface area of connection between the shielding device (e.g., the first shielding internal device 32) and the first shielding layer 13 is greater than 1.3% of an outer surface area of the shielding device (e.g., the first shielding internal device 32), thereby ensuring the connection effect between the shielding device and the first shielding layer 13.

In addition, an outer surface area of connection between the shielding device (i.e., the second shielding internal device 34) and the second shielding layer 23 is greater than 1.3% of an outer surface area of the shielding device (i.e., the second shielding internal device 34), thereby ensuring the connection effect between the shielding device and the second shielding layer 23.

Specifically, the larger the connection area between the shielding device and the first shielding layer 13 or the second shielding layer 23, the better the mechanical property therebetween. In the use environment, a breakage will not occur under the external force as long as a drawing force between the shielding device and the first shielding layer 13 or the second shielding layer 23 meets the standard requirement. It is found, after many experiments and tests, that when the outer surface area of connection between the shielding device and the first shielding layer 13 or the second shielding layer 23 is less than 1.3% of the outer surface area of the shielding device, the drawing force between the shielding device and the first shielding layer 13 or the second shielding layer 23 cannot meet the standard requirement, and a breakage occurs, which leads to a degradation or a failure of the shielding performance, and even leads to a loss of the shielding function in severe cases.

Table 4 shows the influence of the connection area between the shielding device and the shielding layer on the drawing force therebetween.

TABLE 4

| Ratio of the outer surface area of connection between the shielding internal device and the shielding layer to the outer surface area of the shielding internal device (%) | | | | | | | | | | | | | | | |
|---|---|---|---|---|---|---|---|---|---|---|---|---|---|---|---|
| 0.1 | 0.3 | 0.5 | 0.8 | 1 | 1.3 | 1.6 | 2 | 5 | 10 | 30 | 50 | 70 | 80 | 90 | 100 |
| Drawing force (N) between the shielding device and the shielding layer | | | | | | | | | | | | | | | |
| Breakage | Breakage | 11 | 13 | 35 | 51 | 74 | 82 | 107 | 124 | 151 | 168 | 177 | 173 | 186 | 193 |

The above table shows the data obtained by performing a test on a selected cable with a certain wire diameter. The standard requirement is that the drawing force between the shielding device and the shielding layer is greater than 50 N.

Thus, an outer surface area of connection between the shielding device and the first shielding layer 13 or the second shielding layer 23 is greater than 1.3% of an outer surface area of the shielding device, thereby ensuring the connection effect between the shielding device and the first shielding layer 13 or the second shielding layer 23.

In addition, an outer surface area of connection between the first end of the conductive device 31 and the first shielding device 13 is greater than 1.4% of an outer surface area of the shielding device (e.g., the first shielding middle device 33), thereby ensuring the connection effect between the first end of the conductive device 31 and the first shielding layer 13.

In addition, an outer surface area of connection between the second end of the conductive device 31 and the second shielding layer 23 is greater than 1.4% of an outer surface area of the shielding device (e.g., the second shielding middle device 35), thereby ensuring the connection effect between the second end of the conductive device 31 and the second shielding layer 23.

Specifically, the larger the connection area between the conductive device 31 and the first shielding layer 13 or the second shielding layer 23, the better the mechanical property therebetween. In the use environment, a breakage will not occur under the external force as long as a drawing force between the conductive device 31 and the first shielding layer 13 or the second shielding layer 23 meets the standard requirement. It is found, after many experiments and tests, that when the outer surface area of connection between the conductive device 31 and the first shielding layer 13 or the second shielding layer 23 is less than 1.4% of the outer surface area of the shielding device, the drawing force between the conductive device 31 and the first shielding layer 13 or the second shielding layer 23 cannot meet the standard requirement, and a breakage occurs, which leads to a degradation or a failure of the shielding performance, and even leads to a loss of the shielding function in severe cases.

Table 5 shows the influence of the connection area between the conductive device and the shielding layer on the drawing force therebetween.

The above table shows the data obtained by performing a test on a selected cable with a certain wire diameter. The standard requirement is that the drawing force between the conductive device and the shielding layer is greater than 50 N.

Thus, an outer surface area of connection between the conductive device 31 and the first shielding layer 13 or the second shielding layer 23 is greater than 1.4% of an outer surface area of the shielding device, thereby ensuring the connection effect between the conductive device 31 and the first shielding layer 13 or the second shielding layer 23.

In addition, a minimum cross-sectional area of a connection position between the first end (the left end in the figure) of the conductive device 31 and the first shielding device 13 is 60% to 260% of the cross-sectional area of the first shielding layer 13, thereby ensuring the connection effect between the first end of the conductive device 31 and the first shielding layer 13.

In addition, a minimum cross-sectional area of a connection position between the second end (the right end in the figure) of the conductive device 31 and the second shielding layer 23 is 60% to 260% of the cross-sectional area of the second shielding layer 23, thereby ensuring the connection effect between the second end of the conductive device 31 and the second shielding layer 23.

The main function of the first shielding layer 13 and the second shielding layer 23 is to ground the eddy current generated by the current-conducted cable core to avoid the electromagnetic interference. The larger the cross-sectional area of the cable core, the larger the current that the cable core can conduct, and thus the larger the eddy current generated in the shielding layer. When the minimum cross-sectional area of the connection position between the first end of the conductive device 31 and the first shielding layer 13 or the second shielding layer 23 is less than the standard requirement, local heat will be generated at the connection position, and in severe cases, the connection position between the conductive device 31 and the first shielding layer 13 or the second shielding layer 23 will be burned, resulting in degradation or failure of the shielding performance.

Table 6 shows the influence of a ratio of the minimum cross-sectional area of the connection position between the conductive device and the first shielding layer to the cross-sectional area of the first shielding layer on a temperature rise value between the conductive device and the shielding layer.

TABLE 5

| Ratio of the outer surface area of connection between the conductive device and the shielding layer to the outer surface area of the shielding device (%) | | | | | | | | | | | | | | | |
|---|---|---|---|---|---|---|---|---|---|---|---|---|---|---|---|
| 0.1 | 0.3 | 0.5 | 0.8 | 1 | 1.4 | 1.6 | 2 | 5 | 10 | 30 | 50 | 70 | 80 | 90 | 100 |
| Drawing force (N) between the conductive device and the shielding layer | | | | | | | | | | | | | | | |
| Breakage | Breakage | 12 | 19 | 28 | 51 | 74 | 87 | 95 | 122 | 155 | 167 | 172 | 177 | 185 | 194 |

TABLE 6

| Ratio of the minimum cross-sectional area of the connection position between the conductive device and the first shielding layer to the cross-sectional area of the first shielding layer (%) | | | | | | | | | | | | | | | |
|---|---|---|---|---|---|---|---|---|---|---|---|---|---|---|---|
| 20 | 40 | 60 | 80 | 100 | 120 | 140 | 160 | 180 | 200 | 220 | 240 | 260 | 280 | 300 | 320 |
| Temperature rise value between the conductive device and the first shielding layer (° C.) | | | | | | | | | | | | | | | |
| 63 | 55 | 48 | 45 | 42 | 39 | 37 | 35 | 32 | 29 | 27 | 24 | 22 | 22 | 21 | 20 |

Table 7 shows the influence of a ratio of the minimum cross-sectional area of the connection position between the conductive device and the second shielding layer to the cross-sectional area of the second shielding layer on a temperature rise value between the conductive device and the shielding layer.

TABLE 7

| Ratio of the minimum cross-sectional area of the connection position between the conductive device and the second shielding layer to the cross-sectional area of the second shielding layer (%) | | | | | | | | | | | | | | | |
|---|---|---|---|---|---|---|---|---|---|---|---|---|---|---|---|
| 20 | 40 | 60 | 80 | 100 | 120 | 140 | 160 | 180 | 200 | 220 | 240 | 260 | 280 | 300 | 320 |
| Temperature rise value between the conductive device and the second shielding layer (° C.) | | | | | | | | | | | | | | | |
| 64 | 56 | 49 | 44 | 42 | 38 | 36 | 34 | 30 | 28 | 26 | 23 | 21 | 22 | 22 | 21 |

The above table shows the data obtained by performing a test on a selected cable with a certain wire diameter. The standard requirement is that the temperature rise value between the conductive device and the shielding layer is less than 50° C.

As can be seen from the above table, when the ratio of the minimum cross-sectional area of the connection position between the conductive device 31 and the first shielding layer 13 or the second shielding layer 23 to the cross-sectional area of the first shielding layer 13 or the second shielding layer 23 is less than 60%, the temperature rise value between the conductive device 31 and the first shielding layer 13 or the second shielding layer 23 does not meet the standard requirement.

When the ratio of the minimum cross-sectional area of the connection position between the conductive device 31 and the first shielding layer 13 or the second shielding layer 23 to the cross-sectional area of the first shielding layer 13 or the second shielding layer 23 is more than 260%, since the cross-sectional area of the first shielding layer 13 or the second shielding layer 23 is already much larger than a minimum conduction area of the eddy current, the temperature rise value between the conductive device 31 and the first shielding layer 13 or the second shielding layer 23 is the same as that when the ratio is 260%, but the spent cost and the processing cycle are increased.

Therefore, it is preferable that the minimum cross-sectional area of the connection position between first end of the conductive device 31 and the first shielding layer 13 is 60% to 260% of the cross-sectional area of the first shielding layer 13, and the minimum cross-sectional area of the connection position between the second end of the conductive device 31 and the second shielding layer 23 is 60% to 260% of the cross-sectional area of the second shielding layer 23.

Specifically, an impedance of the connection position between the shielding device and the first shielding layer is less than 13.7 mΩ, and an impedance of the connection position between the shielding device and the second shielding layer is less than 13.7 mΩ.

Exemplarily, the impedance of the connection position between the shielding device and the first shielding layer is less than 12.5 mΩ, and the impedance of the connection position between the shielding device and the second shielding layer is less than 12.5 mΩ.

The impedance of the connection position between the shielding device and the shielding layer should be as small as possible, so that the current generated by the shielding layer can flow back to an energy source or a grounded position without hindrance. If the impedance of the connection position between the shielding device and the shielding layer is large, large current will be generated at the connection position between the shielding device and the shielding layer, thereby causing a large radiation at the cable connection position.

The test method is as follows: a test instrument outputs a signal value (recorded as test value 2) to a first cable or a second cable, and a detection device is disposed outside the cable assembly to detect a signal value (recorded as test value 1). A shielding performance value=test value 2−test value 1.

Table 8 shows the influence of the impedance of the connection position between the shielding device and the shielding layer on the shielding performance.

TABLE 8

| | Impedance (mΩ) of the connection position between the shielding device and the shielding layer | | | | | | | | | | |
|---|---|---|---|---|---|---|---|---|---|---|---|
| Test parameter | 9.1 | 9.7 | 10.1 | 11.3 | 11.9 | 12.5 | 13.1 | 13.7 | 14.3 | 14.9 | 15.5 |
| Shielding performance value (dB) | 72 | 71 | 70 | 70 | 69 | 68 | 65 | 62 | 56 | 51 | 47 |

The above table shows the data obtained by performing a test on a selected cable with a certain wire diameter. The standard requirement is that the shielding performance value of the connection position between the shielding device and the shielding layer is greater than 60 dB.

When the impedance of the connection position between the shielding device and the first shielding layer is greater than 13.7 mΩ, and the impedance of the connection position between the shielding device and the second shielding layer is greater than 13.7 mΩ, the shielding performance value of the connection position between the shielding device and the shielding layer is less than 60 dB, which does not meet the standard requirement. Moreover, when the impedance of the connection position between the shielding device and the first shielding layer is less than 12.5 mΩ, and the impedance of the connection position between the shielding device and the second shielding layer is less than 12.5 mΩ, the shielding performance value of the connection position between the shielding device and the shielding layer changes little. Therefore, the inventor sets the impedance of the connection position between the shielding device and the first shielding layer to be less than 13.7 mΩ, and the impedance of the connection position between the shielding device and the second shielding layer to be less than 13.7 mΩ.

Exemplarily, the impedance of the connection position between the shielding device and the first shielding layer is less than 12.5 mΩ, and the impedance of the connection position between the shielding device and the second shielding layer is less than 12.5 mΩ.

Specifically, the impedance of the connection position between the first end of the conductive device and the first shielding layer is less than 13.7 mΩ, and the impedance of the connection position between the second end of the conductive device and the second shielding layer is less than 13.7 mΩ.

Exemplarily, the impedance of the connection position between the first end of the conductive device and the first shielding layer is less than 12.5 mΩ, and the impedance of the connection position between the second end of the conductive device and the second shielding layer is less than 12.5 mΩ.

The impedance of the connection position between the conductive device and the shielding layer should be as small as possible, so that the current generated by the shielding layer can flow back to an energy source or a grounded position without hindrance. If the impedance of the connection position between the conductive device and the shielding layer is large, large current will be generated at the connection position between the conductive device and the shielding layer, thereby causing a large radiation at the cable connection position.

The test method is as follows: a test instrument outputs a signal value (recorded as test value 2) to a first cable or a second cable, and a detection device is disposed outside the cable assembly to detect a signal value (recorded as test value 1). A shielding performance value=test value 2−test value 1.

Table 9 shows the influence of the impedance of the connection position between the conductive device and the shielding layer on the shielding performance.

TABLE 9

| | Impedance (mΩ) of the connection position between the conductive device and the shielding layer | | | | | | | | | | |
|---|---|---|---|---|---|---|---|---|---|---|---|
| Test parameter | 9.1 | 9.7 | 10.1 | 11.3 | 11.9 | 12.5 | 13.1 | 13.7 | 14.3 | 14.9 | 15.5 |
| Shielding performance value (dB) | 72 | 71 | 70 | 70 | 69 | 68 | 65 | 62 | 56 | 51 | 47 |

The above table shows the data obtained by performing a test on a selected cable with a certain wire diameter. The standard requirement is that the shielding performance value of the connection position between the conductive device and the shielding layer is greater than 60 dB.

When the impedance of the connection position between the first end of the conductive device and the first shielding layer is greater than 13.7 mΩ, and the impedance of the connection position between the second end of the conductive device and the second shielding layer is greater than 13.7 mΩ, the shielding performance value of the connection position between the conductive device and the shielding layer is less than 60 dB, which does not meet the standard requirement. Moreover, when the impedance of the connection position between the first end of the conductive device and the first shielding layer is less than 12.5 mΩ, and the impedance of the connection position between the second end of the conductive device and the second shielding layer is less than 12.5 mΩ, the shielding performance value of the connection position between the conductive device and the shielding layer changes little. Therefore, the inventor sets the impedance of the connection position between the first end of the conductive device and the first shielding layer to be less than 13.7 mΩ, and the impedance of the connection position between the second end of the conductive device and the second shielding layer to be less than 13.7 mΩ.

Exemplarily, the impedance of the connection position between the first end of the conductive device and the first shielding layer is less than 12.5 mΩ, and the impedance of the connection position between the second end of the conductive device and the second shielding layer is less than 12.5 mΩ.

As illustrated in FIG. 14, in practical applications, the first cable 10 may generally include a third protective layer 14 (which may also be understood as an outer cover), and the second cable 20 may generally include a fourth protective layer 24 (which may also be understood as an outer cover).

Specifically, the third protective layer 14 is disposed on an outer side of the first shielding layer 13 to prevent the first shielding layer 13 from being in conductive contact with other components, thereby improving the use safety of the first cable 10, and further improving the overall waterproof and dustproof performance of the first cable 10.

During implementations, the third protective layer 14 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

Correspondingly, in the second cable 20, the fourth protective layer 24 is disposed on an outer side of the second shielding layer 23 to prevent the second shielding layer 23 from being in conductive contact with other components, thereby improving the use safety of the second cable 20, and further improving the overall waterproof and dustproof performance of the second cable 20.

During implementations, the fourth protective layer 24 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

In addition, during implementations, an insulation sleeve (not illustrated) may also be disposed on an outer side of the shielding connection assembly 30. A left end of the insulation sleeve may be wrapped around the outer side of the third protective layer 14 of the first cable 10, and a right end of the insulation sleeve may be wrapped around the outer side of the fourth protective layer 24 of the second cable 20, so as to improve the reliability of the shielding connection assembly 30 and prevent the shielding connection assembly 30 from being in conductive contact with the external conductor. During specific configurations, the insulation sleeve may be a structural member with good insulation such as a heat shrinkable tube, and the specific material and type of the insulation sleeve may be adaptively selected according to the actual needs, which will not be specifically limited in the present disclosure.

When a cable assembly is to be manufactured, the following steps may be adopted.

Figure 21:
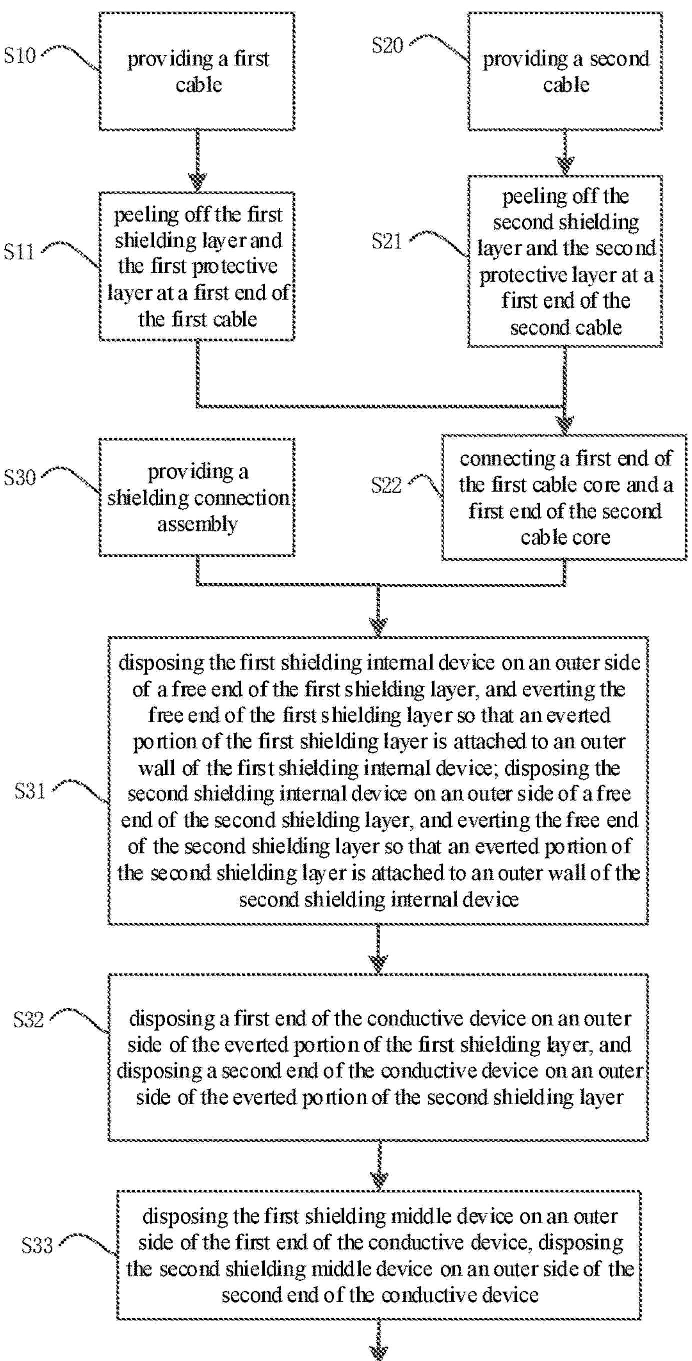
FIG. 21 illustrates a flowchart of a manufacturing method for a cable assembly according to an embodiment of the present disclosure.

Referring to FIGS. 3 and 21, the method may include:

S10: providing a first cable 10, which includes a first cable core 11, a first protective layer 12 and a first shielding layer 13; the first protective layer 12 is disposed on an outer side of the first cable core 11, and the first shielding layer 13 is disposed on an outer side of the first protective layer 12.

S11: peeling off the first shielding layer 13 and the first protective layer 12 at a first end of the first cable 10 (a right end of the first cable 10 in FIG. 3) to expose the first cable core 11.

S20: providing a second cable 20, which includes a second cable core 21, a second protective layer 22 and a second shielding layer 23; the second protective layer 22 is disposed on an outer side of the second cable core 21, and the second shielding layer 23 is disposed on an outer side of the second protective layer 22.

S21: peeling off the second shielding layer 23 and the second protective layer 22 at a first end of the second cable 20 (a left end of the second cable 20 in FIG. 3) to expose the second cable core 21.

S22: connecting a first end of the first cable core 11 and a first end of the second cable core 21 to realize an electrical connection between the first cable core 11 and the second cable core 21.

S30: providing a shielding connection assembly 30, which includes a conductive device 31, a first shielding internal device 32, a first shielding middle device 33, a second shielding internal device 34 and a second shielding middle device 35.

S31: disposing the first shielding internal device 32 on an outer side of a free end of the first shielding layer 13, and everting the free end of the first shielding layer 13, so that an everted portion 131 is attached to an outer wall of the first shielding internal device 32; disposing the second shielding internal device 34 on an outer side of a free end of the second shielding layer 23, and everting the free end of the second shielding layer 23, so that an everted portion 231 is attached to an outer wall of the second shielding internal device 34.

S32: disposing a first end of the conductive device 31 on an outer side of the everted portion 131 of the first shielding layer 13, and disposing a second end of the conductive device 31 on an outer side of the everted portion 231 of the second shielding layer 23, so as to realize a connection between the first shielding layer 213 and the second shielding layer 223.

S33: disposing the first shielding middle device 33 on an outer side of the first end of the conductive device 31, and disposing the second shielding middle device 35 on an outer side of the second end of the conductive device 31.

It can be understood that during implementations, the first shielding middle device 33 may be disposed on the outer side of the first end of the conductive device 31 in advance, and then the first end of the conductive device 31 is disposed on the outer side of the first shielding layer 13. Correspondingly, the second shielding external device 35 may be disposed on the outer side of the second end of the conductive device 31 in advance, and then the second end of the conductive device 31 is disposed on the outer side of the second shielding layer 23.

S34: welding the first end of the conductive device 31 and the everted portion 131 of the first shielding layer 13 between the first shielding internal device 32 and the first shielding middle device 33, and welding the second end of the conductive device 13 and the everted portion 231 of the second shielding layer 23 between the second shielding internal device 34 and the second shielding middle device 35; or, crimping the first end of the conductive device 31 and the everted portion 131 of the first shielding layer 13 between the first shielding internal device 32 and the first shielding middle device 33, and crimping the second end of the conductive device 31 and the everted portion 231 of the second shielding layer 23 between the second shielding internal device 34 and the second shielding middle device 35; or, abutting the first end of the conductive device 31 and the everted portion 131 of the first shielding layer 13 between the first shielding internal device 32 and the first shielding middle device 33, and abutting the second end of the conductive device 13 and the everted portion 231 of the second shielding layer 23 between the second shielding internal device 34 and the second shielding middle device 35.

During welding, laser welding, ultrasonic welding, resistance welding, pressure diffusion welding, or soldering, etc. may be adopted to weld the first end of the conductive device 31 with the everted portion 131 of the first shielding layer 13, and weld the second end of the conductive device 31 with the everted portion 231 of the second shielding layer 23.

During crimping, a tool such as a crimping plier may be adopted to exert a force on the first shielding middle device 33 and the second shielding middle device 34, so as to realize a crimping connection between the first shielding middle device 33 and the first shielding internal device 32, and a crimping connection between the second shielding middle device 35 and the second shielding internal device 34.

In this process, since the first shielding internal device 32 has a certain strength, it can prevent the first cable core 11 from being obviously extruded. Correspondingly, since the second shielding internal device 34 has a certain strength, it can prevent the second cable core 21 from being obviously extruded.

In step S22, connecting the first end of the first cable core 11 and the first end of the second cable core 21 specifically includes: connecting the first end of the first cable core 11 and the first end of the second cable core 21 by welding or crimping.

It can be understood that during implementations, the first cable core 11 may also be connected to the second cable core 21 in other ways so as to realize an conductive connection and a mechanical connection between the first cable core 11 and the second cable core 21.

In addition, before step S32, the method further includes: disposing an isolation sleeve 39 on an outer side of the connection position between the first cable core 11 and the second cable core 21, so as to prevent undesirable conditions such as the connection position being in conductive contact with the conductive device 11.

The isolation sleeve 39 may be a heat shrinkable tube, or any other insulation layers directly injection-molded on the outer side of the connection position.

In addition, in some embodiments, when a third protective layer 14 is disposed on the outer side of the first cable 10, step S11 further includes peeling off the third protective layer 14 of the first cable 10. Correspondingly when a fourth protective layer 24 is disposed on an outer side of the second cable 20, step S21 further includes peeling off the fourth protective layer 24 of the second cable 20.

Figure 22:
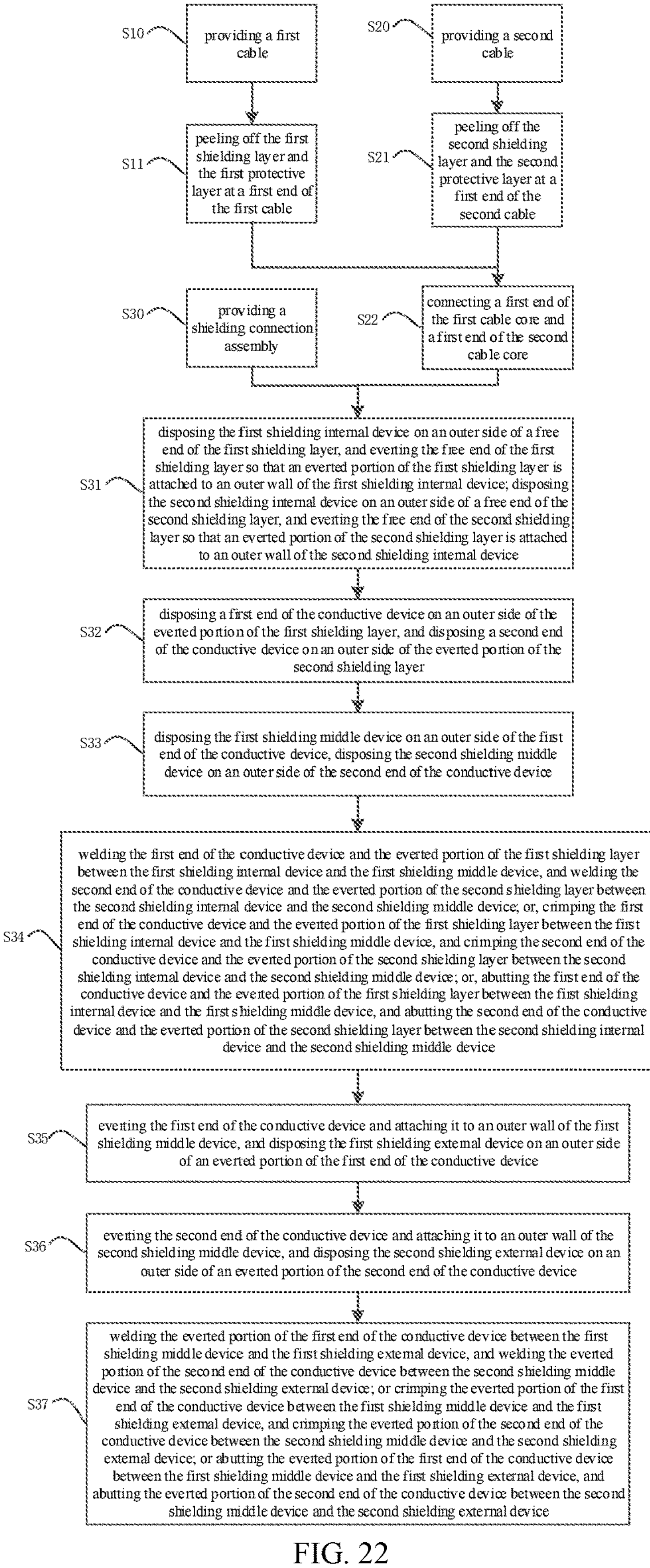
FIG. 22 illustrates a flowchart of another manufacturing method for a cable assembly according to an embodiment of the present disclosure.

In addition, as illustrated in FIG. 22, an embodiment of the present disclosure further provides a manufacturing method of another cable assembly. In the manufacturing method, steps S35 to S37 are added.

Specifically, referring to FIGS. 4 and 22, after step S34, the manufacturing method further includes:

S35: everting the first end of the conductive device 31 by 180°, attaching the first end of the conductive device 31 to an outer wall of the first shielding middle device 33, and disposing a first shielding external device 36 on an outer side of an everted portion 311 of the first end of the conductive device 31.

S36: everting the second end of the conductive device 31 by 180°, attaching the second end of the conductive device 31 to an outer wall of the second shielding middle device 35, and disposing a second shielding external device 37 on an outer side of an everted portion 312 of the second end of the conductive device 31.

S37: welding the everted portion 311 of the conductive device 31 between the first shielding middle device 33 and the first shielding external device 36, and welding the everted portion 312 of the conductive device 31 between the second shielding middle device 35 and the second shielding external device 37; or, crimping the everted portion 311 of the conductive device 31 between the first shielding middle device 33 and the first shielding external device 36, and crimping the everted portion 312 of the conductive device 31 between the second shielding middle device 35 and the second shielding external device 37; or, abutting the everted portion 311 of the conductive device 31 between the first shielding middle device 33 and the first shielding external device 36, and abutting the everted portion 312 of the conductive device 31 between the second shielding middle device 35 and the second shielding external device 37.

During welding, laser welding, ultrasonic welding, resistance welding, pressure diffusion welding, or soldering, etc. may be adopted to weld the everted portion 311 of the conductive device 31 between the first shielding middle device 33 and the first shielding external device 36, and welding the everted portion 312 of the conductive device 31 between the second shielding middle device 35 and the second shielding external device 37.

During crimping, a tool such as a crimping plier may be adopted to exert a force on the first shielding external device 36 and the second shielding external device 37, so as to realize a crimping connection between the first shielding external device 36 and the first shielding middle device 33, and a crimping connection between the second shielding external device 37 and the second shielding middle device 35.

In addition, the manufacturing method may further include: disposing an insulation sleeve on an outer side of the shielding connection assembly 30. A left end of the insulation sleeve may be wrapped around an outer side of the third protective layer 14 of the first cable 10, and a right end of the insulation sleeve may be wrapped around an outer side of the fourth protective layer 24 of the second cable 20, so as to improve the reliability of the shielding connection assembly 30 and prevent the shielding connection assembly 30 from being in conductive contact with the external conductor. During specific configurations, the insulation sleeve may be a structural member with good insulation such as a heat shrinkable tube, and the specific material and type of the insulation sleeve may be adaptively selected according to the actual needs, which will not be specifically limited in the present disclosure.

It can be understood that when the cable assembly is to be manufactured, the manufacturing sequence may be adjusted adaptively according to the actual situation, and some steps may be added or omitted, which is not limited in the present disclosure.

Obviously, various modifications and variations can be made to the present disclosure by those skilled in the art without departing from the spirit and scope of the present disclosure. Thus, if these modifications and variations to the present disclosure fall within the scope of the claims of the present disclosure and their technical equivalents, the present disclosure is intended to include these modifications and variations.

What is claimed is:

1. A cable assembly, comprising:

a first cable which comprises a first cable core and a first shielding layer, wherein a first protective layer is wrapped around an outer side of the first cable core, and the first shielding layer is disposed on an outer side of the first protective layer;

a second cable which comprises a second cable core and a second shielding layer, wherein a second protective layer is wrapped around an outer side of the second cable core, and the second shielding layer is disposed on an outer side of the second protective layer; and a shielding connection assembly which comprises at least one shielding device, wherein at least one shielding device is connected to the first shielding layer and the second shielding layer, wherein:

the free end of the first shielding layer is everted to form a first everted portion, and the free end of the second shielding layer is everted to form a second everted portion;

the shielding connection assembly comprises a first shielding internal device, a second shielding internal device, a first shielding middle device, and a second shielding middle device;

the first shielding internal device is disposed on an outer side of the first shielding layer, and the first everted portion is attached to an outer wall of the first shielding internal device;

the second shielding internal device is disposed on an outer side of the second shielding layer, and the second everted portion is attached to an outer wall of the second shielding internal device;

the shielding connection assembly further comprises a conductive device having a first end and a second end, the first end of the conductive device being disposed on an outer side of the first everted portion, and the second end of the conductive device being disposed on an outer side of the second everted portion; and the first shielding middle device is disposed on an outer side of the first end of the conductive device, and the second shielding middle device is disposed on an outer side of the second end of the conductive device.

2. The cable assembly according to claim 1, wherein a connection position between the shielding device and the first shielding layer is in a symmetrical connection arrangement or a 360° connection arrangement; and a connection position between the shielding device and the second shielding layer is in a symmetrical connection arrangement or a 360° connection arrangement.

3. The cable assembly according to claim 1, wherein the shielding connection assembly further comprises a conductive device, which has a first end connected to the first shielding layer directly or through at least one shielding device, and a second end connected to the second shielding layer directly or through at least one shielding device.

4. The cable assembly according to claim 3, wherein a connection position between the first end of the conductive device and the first shielding layer is in a symmetrical connection arrangement or a 360° connection arrangement; and a connection position between the second end of the conductive device and the second shielding layer is in a symmetrical connection arrangement or a 360° connection arrangement.

5. The cable assembly according to claim 3, wherein the shielding connection assembly comprises:

a first shielding internal device disposed on an outer side of the first shielding layer, and a free end of the first shielding layer is attached to an outer wall of the first shielding internal device after being everted;

a second shielding internal device disposed on an outer side of the second shielding layer, and a free end of the second shielding layer is attached to an outer wall of the second shielding internal device after being everted;

a first shielding middle device disposed on an outer side of the first end of the conductive device, wherein the first end of the conductive device and the free end of the first shielding layer are crimped or welded or abutted between the first shielding internal device and the first shielding middle device; and a second shielding middle device disposed on an outer side of the second end of the conductive device, wherein the second end of the conductive device and the free end of the second shielding layer are crimped or welded or abutted between the second shielding internal device and the second shielding middle device.

6. The cable assembly according to claim 5, wherein the shielding connection assembly further comprises a first shielding external device and a second shielding external device;

after the first shielding middle device is disposed on the outer side of the first end of the conductive device, the first end of the conductive device is everted and attached to an outer wall of the first shielding middle device;

the first shielding external device is disposed on an outer side of an everted portion of the first end of the conductive device;

after the second shielding middle device is disposed on an outer side of the second end of the conductive device, the second end of the conductive device is everted and attached to an outer all of the second shielding middle device; and the second shielding external device is disposed on an outer side of an everted portion of the second end of the conductive device.

7. The cable assembly according to claim 3, wherein an inner wall of the conductive device is provided with an inner insulation layer, and the first end and the second end of the conductive device are not provided with the inner insulation layer; and an outer wall of the conductive device is provided with an outer insulation layer, and the first end and the second end of the conductive device are not provided with the outer insulation layer.

8. The cable assembly according to claim 3, wherein the first cable core is lapped or butted with the second cable core.

9. The cable assembly according to claim 8, wherein a minimum cross-sectional area of a lapped or butted position is greater than or equal to a smallest one of a cross-sectional area of the first cable core and a cross-sectional area of the second cable core.

10. The cable assembly according to claim 1, wherein an outer surface area of connection between the shielding device and the first shielding layer is greater than 1.3% of an outer surface area of the shielding device; and an outer surface area of connection between the shielding device and the second shielding layer is greater than 1.3% of an outer surface area of the shielding device.

11. The cable assembly according to claim 3, wherein a minimum cross-sectional area of a connection position between the first end of the conductive device and the first shielding layer is 60% to 260% of a cross-sectional area of the first shielding layer; and a minimum cross-sectional area of a connection position between the second end of the conductive device and the second shielding layer is 60% to 260% of a cross-sectional area of the second shielding layer.

12. The cable assembly according to claim 3, wherein an outer surface area of connection between the first end of the conductive device and the first shielding layer is greater than 1.4% of an outer surface area of the shielding device; and an outer surface area of connection between the second end of the conductive device and the second shielding layer is greater than 1.4% of an outer surface area of the shielding device.

13. The cable assembly according to claim 1, wherein an impedance of a connection position between the shielding device and the first shielding layer is less than 13.7 mΩ, and an impedance of a connection position between the shielding device and the second shielding layer is less than 13.7 mΩ.

14. The cable assembly according to claim 3, wherein an impedance of a connection position between the first end of the conductive device and the first shielding layer is less than 13.7 mΩ, and an impedance of a connection position between the second end of the conductive device and the second shielding layer is less than 13.7 mΩ.

15. The cable assembly according to claim 1, further comprising an isolation sleeve;

wherein the isolation sleeve is disposed on an outer side of the first end of the first cable core and an outer side of the first end of the second cable core; and one end of the isolation sleeve is connected to the first protective layer, and the other end of the isolation sleeve is connected to the second protective layer.

16. The cable assembly according to claim 1, wherein the first cable further comprises a third protective layer, and the second cable further comprises a fourth protective layer;

the third protective layer is disposed on an outer side of the first shielding layer, and the fourth protective layer is disposed on an outer side of the second shielding layer.

17. The cable assembly according to claim 1, wherein:

the first shielding internal device and the first shielding middle device are separately provided, an inner wall of the first shielding internal device is attached to an outer side of the first shielding layer, the second shielding internal device and the second shielding middle device are separately provided, and an inner wall of the second shielding internal device is attached to an outer side of the second shielding layer.

* * * * *